(12) United States Patent
Forrest

(10) Patent No.: US 12,030,732 B2
(45) Date of Patent: Jul. 9, 2024

(54) SUBTERRANEAN ENERGY STORAGE SYSTEM

(71) Applicant: ECONOMICAL ENERGY PTY LTD, Adelaide (AU)

(72) Inventor: Matthew Colin Forrest, Adelaide (AU)

(73) Assignee: ECONOMICAL ENERGY PTY LTD, Adelaide (AU)

( * ) Notice: Subject to any disclaimer, the term of this patent is extended or adjusted under 35 U.S.C. 154(b) by 265 days.

(21) Appl. No.: 17/755,777

(22) PCT Filed: Nov. 6, 2020

(86) PCT No.: PCT/AU2020/000129
§ 371 (c)(1),
(2) Date: May 6, 2022

(87) PCT Pub. No.: WO2021/087546
PCT Pub. Date: May 14, 2021

(65) Prior Publication Data
US 2022/0402700 A1  Dec. 22, 2022

(30) Foreign Application Priority Data

Nov. 7, 2019 (AU) .............................. 2019904201

(51) Int. Cl.
*B65G 5/00* (2006.01)
*F03B 7/00* (2006.01)
(Continued)

(52) U.S. Cl.
CPC ................ *B65G 5/00* (2013.01); *F03B 7/006* (2013.01); *F03B 9/005* (2013.01); *F03B 13/06* (2013.01);
(Continued)

(58) Field of Classification Search
CPC .......... F03G 7/065; F03G 7/06; G01K 5/483; G12B 1/00; F05B 2250/25;
(Continued)

(56) References Cited

U.S. PATENT DOCUMENTS 3,987,307 A * 10/1976 Giconi ................ H02K 7/1823
446/166
4,201,059 A    5/1980 Feder
(Continued)

FOREIGN PATENT DOCUMENTS

AU    2014222692 B2    9/2014
AU    2017213583 B2    8/2017
(Continued)

*Primary Examiner* — Shafiq Mian
(74) *Attorney, Agent, or Firm* — AVEK IP, LLC; Kent R. Erickson

(57) ABSTRACT

A subterranean energy storage system configured to store and subsequently release potential energy. Storage of potential energy is achieved by the transfer of a pseudo fluid from a first storage tank to a second storage tank located above the first storage tank, and is subsequently released by the transfer of the pseudo fluid from the second storage tank to the first storage tank. To transfer the pseudo fluid between the first and second storage tanks, the subterranean energy storage system comprises at least one continuous conveyor mechanism extending through at least one transport shaft, wherein the at least one continuous conveyor mechanism comprises a plurality of vessels arranged along a length of the continuous conveyor mechanism. The subterranean energy storage system further comprises an energy transfer means operably connected to the at least one continuous conveyor mechanism to transfer power to and from the subterranean energy storage system.

29 Claims, 13 Drawing Sheets

(51) Int. Cl.
*F03B 9/00* (2006.01)
*F03B 13/06* (2006.01)
*F03D 9/16* (2016.01)
*F03G 3/04* (2006.01)
*H02J 15/00* (2006.01)
*H02K 7/18* (2006.01)

(52) U.S. Cl.
CPC ............... *F03D 9/16* (2016.05); *F03G 3/04* (2013.01); *H02J 15/003* (2013.01); *H02K 7/18* (2013.01); *F05B 2240/40* (2013.01); *F05B 2250/315* (2013.01); *F05B 2260/422* (2020.08)

(58) Field of Classification Search
CPC ...... F05B 2260/231; F05B 2280/10304; F05B 2280/10723; F05B 2280/1073; F05B 2280/5006; F05B 2240/93; F05B 2260/4031; F05B 2220/706; F05B 2240/97; F05B 2280/5001; F03B 13/26; F03B 13/16; F03B 13/188; F03B 13/1885; F03B 13/20; F03B 15/00; F03B 13/24; F03B 13/1845; F03B 13/14; F03B 13/142; Y02E 10/38; Y02E 10/32; C08B 37/0081; B25J 9/0015; B25J 9/1075; B25J 9/1095; C09D 105/00

See application file for complete search history.

(56) References Cited

U.S. PATENT DOCUMENTS

| 2011/0037275 | A1 | 1/2011 | Peitzke et al. |
| 2011/0285147 | A1* | 11/2011 | Fyke ................. H02J 15/00 290/1 R |
| 2015/0288251 | A1* | 10/2015 | Nakasone ........... B65G 23/00 290/1 D |
| 2016/0003224 | A1 | 1/2016 | McGrath |
| 2019/0063411 | A1 | 2/2019 | Kellinger et al. |

FOREIGN PATENT DOCUMENTS

| CN | 105298764 A | 2/2016 |
| DE | 102013014577 A1 | 3/2015 |
| KR | 20100016846 A | 2/2010 |
| WO | 2009100211 A9 | 8/2009 |
| WO | 2013005056 A1 | 1/2013 |
| WO | 2015078098 A1 | 6/2015 |

* cited by examiner

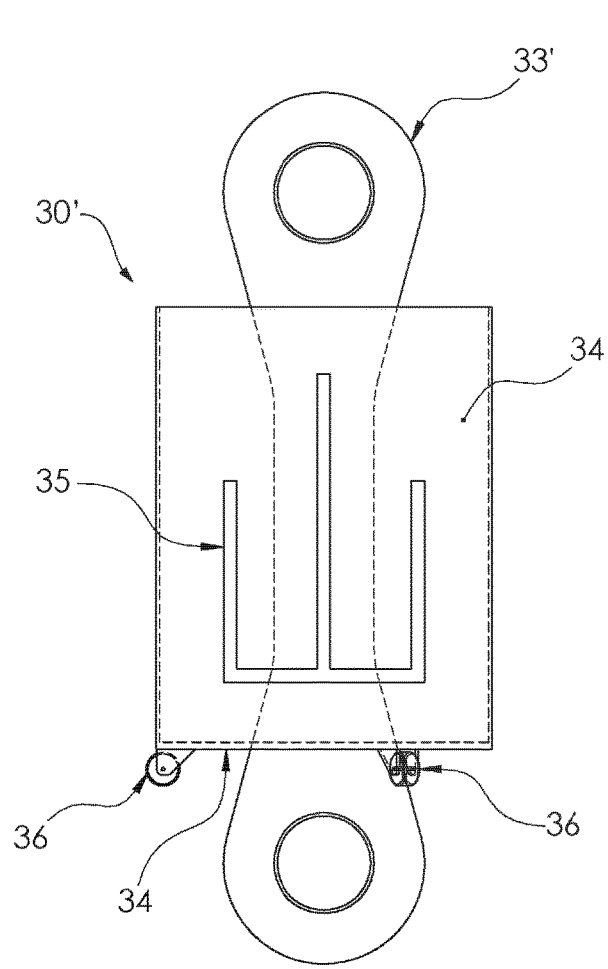
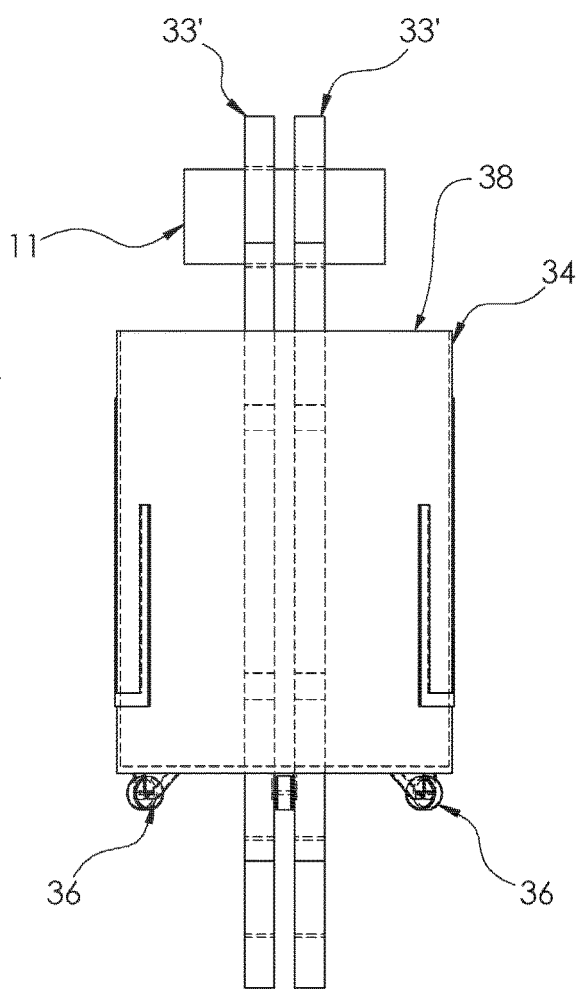
FIGURE 8     FIGURE 9
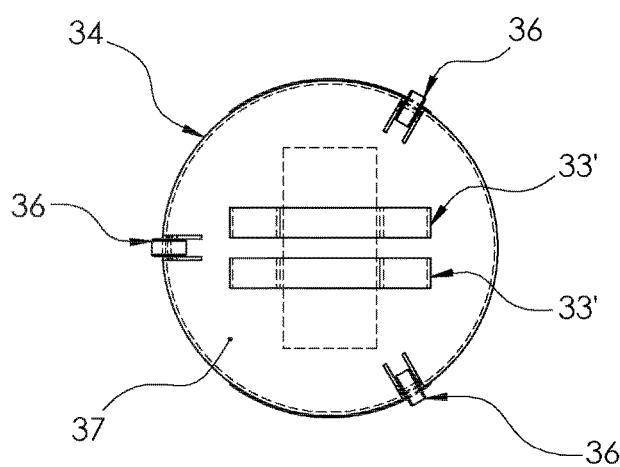
FIGURE 10

SUBTERRANEAN ENERGY STORAGE SYSTEM

PRIORITY DOCUMENTS

The present application claims priority from Australian Provisional Patent Application No. 2019904201 titled "SUBTERRANEAN ENERGY STORAGE SYSTEM" and filed on 7 Nov. 2019, the content of which is hereby incorporated by reference in its entirety.

TECHNICAL FIELD

The present disclosure relates to a subterranean system for storing potential energy. In a particular form the present disclosure relates to a subterranean energy storage system capable of storing and releasing potential energy using a continuous conveyor mechanism.

BACKGROUND

Modern energy grid operators face a challenging environment due to the dramatic changes in the demand for energy over a typical 24-hour period. It is often necessary for the grid operator to dispatch and curtail energy generation assets to manage fluctuations in energy demand. The time difference between minimum and maximum demand can be as long as 12 hours. Therefore energy storage solutions are important technologies for managing the grid, and thus a storage solution that can produce power sufficient for participating in the electricity grid, which can operate for the several hours in duration to bridge the electricity supply and demand is a desired solution.

Energy storage solutions are particularly useful when considering the fluctuating supply of energy from renewable sources, which are totally reliant on the variable nature of wind, sun or ocean waves, which may not coincide with changes in the demand for energy over a period. Energy storage solutions in this scenario excel in their ability to provide fast response supplementary services, storage of energy during times of high output, and release of energy during times of low output from renewable sources.

For example, peak wind speeds for generating energy via wind turbines may not coincide with peak energy demand. As a result, due to the limits of a particular grid, the excess energy generated may be lost, and carbon fueled generating mechanisms connected may be utilised to supply the grid during periods during which energy demand outstrips supply from the wind turbines. Thus, to store excess energy from wind would require the use of a large scale energy storage solution, capable of storing energy during times of peak wind speeds and low energy demand, and that is subsequently able to instantaneously supply energy to the grid during times of high energy demand reducing the likelihood of fluctuating energy supply (or supplementing energy supply with non-renewable sources).

Presently available large scale energy storage is expensive, requires a large geographical footprint, and is expensive to build at an economical scale, an example of which is pumped storage hydroelectricity (also known as pumped hydro). Pumped hydro allows the storage of large quantities of energy, however it requires a large initial investment, the availability of the necessary geographical resources to operate (geographical height and large quantities of water), and also imposes a large visual/environmental impact.

Thus, there is a requirement for a more desirable solution that would have lower or no geographical resource requirements, be cheaper to build at an economical scale, yield higher revenue per project cost, and imposes a lower or no visual/environmental footprint.

It is against this background and the problems and difficulties associated therewith, that the present invention has been developed.

SUMMARY

Embodiments of the present disclosure relate to a subterranean energy storage system which is configured to store potential energy by the transfer of a pseudo fluid from a first storage tank to a second storage tank, and to subsequently release the stored potential energy as required to an energy transfer means by the transfer of the pseudo fluid from the second storage tank back to the first storage tank. The energy transfer means, in use, being capable of transferring power derived from a source of renewable energy to the at least one continuous conveyor mechanism to transfer the pseudo fluid from the first storage tank to the second storage tank, thus storing potential energy.

In certain embodiments, the subterranean energy storage system comprises the at least one continuous conveyor mechanism extending through at least one transport shaft wherein the at least one continuous conveyor mechanism comprises a plurality of vessels arranged along a length of the at least one continuous conveyor mechanism, wherein the plurality of vessels are configured to transfer the pseudo fluid through the transport shaft from the first storage tank to the second storage tank located above the first storage tank to store potential energy, and the transfer of the pseudo fluid from the second storage tank to the first storage tank to release the stored potential energy, and an energy transfer means, wherein the energy transfer means is operably connected to the at least one continuous conveyor mechanism to transfer power to and from the subterranean energy storage system.

According to a first aspect, there is provided a subterranean energy storage system comprising: at least one continuous conveyor mechanism extending through at least one transport shaft, wherein the at least one continuous conveyor mechanism comprises a plurality of vessels arranged along a length of the at least one continuous conveyor mechanism, wherein the plurality of vessels are configured to transfer a pseudo fluid through the transport shaft from a first storage tank to a second storage tank located above the first storage tank to store potential energy, and the transfer of the pseudo fluid from the second storage tank to the first storage tank to release the stored potential energy; and an energy transfer means, wherein the energy transfer means is operably connected to the at least one continuous conveyor mechanism to transfer power to and from the subterranean energy storage system.

In one form, the second storage tank is located at a depth below the Earth's surface.

In one form, the first storage tank is at a depth greater than 100 m below the second storage tank.

In one form, the continuous conveyor mechanism comprises a chain. In an alternative form, the continuous conveyor mechanism comprises a belt.

In one form, the at least one transport shaft comprises a casing.

In one form, the casing is configured to accommodate the at least one continuous conveyor mechanism.

In one form, the casing comprises a diameter greater than 0.3 m to accommodate the at least one continuous conveyor mechanism.

In one form, to store potential energy the energy transfer means, in use, transfers power derived from a source of renewable energy to the at least one continuous conveyor mechanism to transfer the pseudo fluid from the first storage tank to the second storage tank.

In one form, the source of renewable energy comprises wind, wave or solar energy.

In one form, to store potential energy the energy transfer means, in use, transfers power derived from electrical or hydraulic energy to the at least one continuous conveyor mechanism to transfer the pseudo fluid from the first storage tank to the second storage tank.

In one form, the released potential energy is converted to electrical or hydraulic energy.

In one form, the pseudo fluid comprises high density material.

In one form, the high density material is comprised primarily of spheres of a metal alloy.

In one form, the energy transfer means is positioned above the second storage tank.

In one form, the energy transfer means is located above the Earth's surface.

In one form, the energy transfer means comprises a set of sprockets positioned above the second storage tank, and a second set of sprockets positioned proximal to the first storage tank.

In one form, the second set of sprockets comprise one or more upper sprockets positioned above the first storage tank, and one or more lower sprockets positioned below the first storage tank.

In one form, the first and second sets of sprockets co-operate to transfer the pseudo fluid via the at least one continuous conveyor mechanism between the first and second storage tanks.

In one form, the at least one continuous conveyor mechanism comprises one or more profiles along the length of the at least one continuous conveyor mechanism, wherein the one or more profiles permit the at least one continuous conveyor mechanism to engage the first and second sets of sprockets.

In one form, the one or more profiles are rollers along the length of the at least one continuous conveyor mechanism that permit engagement with the first and second sets of sprockets.

In one form, the energy transfer means comprises an auxiliary conveyor and sprocket arrangement positioned on the length along the at least one continuous conveyor mechanism above the second storage tank.

In one form, the auxiliary conveyor and sprocket arrangement comprise a plurality of conveyor support tabs for engaging one or more profiles along the length of the at least one continuous conveyor mechanism.

In one form, the plurality of vessels are arranged along an entire length of the at least one continuous conveyor mechanism.

In one form, the at least one transport shaft comprises a width to height ratio of 1:100 to 1:10,000.

In one form, any one of the first or second storage tanks comprise a width to height aspect ratio of 20:1 to 1:20.

According to a second aspect, there is provided a subterranean energy storage system comprising: a continuous conveyor mechanism, wherein the continuous conveyor mechanism comprises a plurality of vessels arranged along an entire length of the continuous conveyor mechanism, wherein the plurality of vessels are configured to transfer a high density material from a first storage tank to a second storage tank via a transport shaft to store potential energy, and the transfer of the high density material from the second storage tank to the first storage tank releases the stored potential energy, wherein the second storage tank is located at a depth below the Earth's surface and the first storage tank is located at a depth below the second storage tank; and an energy transfer means, wherein the energy transfer means comprises a first set of sprockets positioned above the second storage tank, and a second set of sprockets positioned proximal to the first storage tank, wherein the first and second sets of sprockets co-operate to transfer the high density material via the continuous conveyor mechanism to transfer power to and from the subterranean energy storage system.

BRIEF DESCRIPTION OF DRAWINGS

Embodiments of the present disclosure will be discussed with reference to the accompanying drawings wherein:

FIG. 8 is a front view of a vessel being one of the plurality of vessels used to transport a pseudo fluid or high density material between first and second storage tanks;

FIG. 9 is a side view of the vessel of FIG. 8;

FIG. 10 is a bottom view of the vessel of FIGS. 8 and 9;

In the following description, like reference characters designate like or corresponding parts throughout the figures.

DESCRIPTION OF EMBODIMENTS

Figure 1:
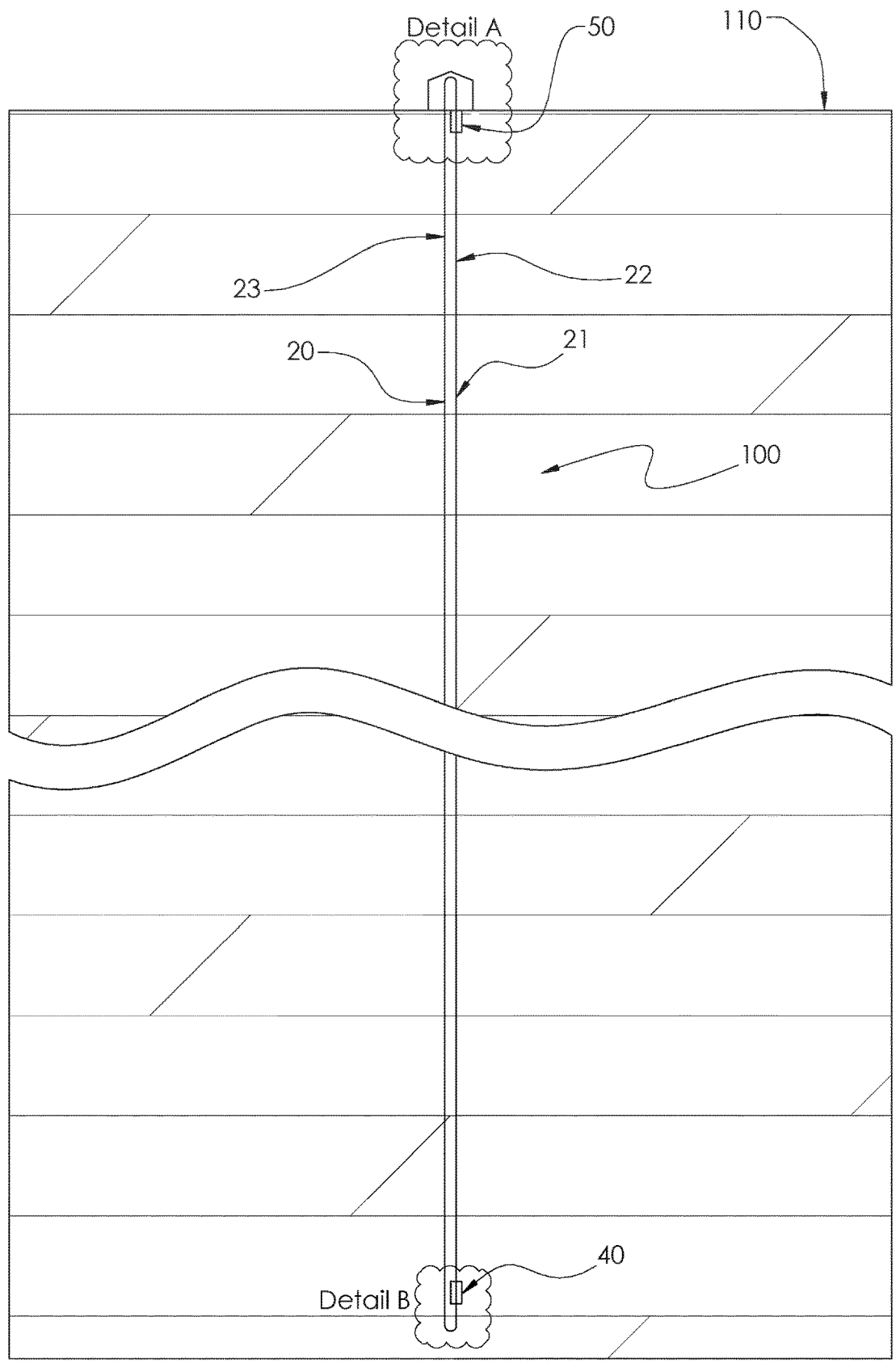
FIG. 1 is a schematic plan diagram illustrating an embodiment of the subterranean energy storage system.

Referring to any one of FIGS. 1 to 7, there is illustrated a subterranean energy storage system (100) according to one embodiment, capable of storing potential energy. The subterranean energy storage system (100) is particularly designed to be substantially located at a depth below the Earth's surface (110), and capable of storing and releasing potential energy.

The subterranean energy storage system (100) comprises at least one continuous conveyor mechanism (10). The at least one continuous conveyor mechanism (10) may extend through at least one transport shaft (20), wherein the at least one continuous conveyor mechanism (10) may comprise a plurality of vessels (30) arranged along a length of the at least one continuous conveyor mechanism (10). The plurality of vessels (30) may be configured to transfer a pseudo fluid (70) through the transport shaft (20) from a first storage tank (40) to a second storage tank (50) located above the first storage tank (40) to store potential energy. Additionally, the plurality of vessels (30) may transfer the pseudo fluid (70) from the second storage tank (50) to the first storage tank (40) to release the stored potential energy. The subterranean energy storage system (100) also comprises an energy transfer means (60). The energy transfer means (60) may be operably connected to the at least one continuous mechanism (10) to transfer power to and from the energy storage system (100).

Referring to any one of the Figures, in one embodiment, the at least one continuous conveyor mechanism (10) may be movable under gravity to transfer the pseudo fluid (70) through the transport shaft (20) from the second storage tank (50) to the first storage tank (40), thereby releasing the stored potential energy. It will be appreciated that, similarly but in converse, the at least one continuous conveyor mechanism (10) being configured to transfer the pseudo fluid (70) through the transport shaft (20) from the first storage tank (40) to the second storage tank (50) works against the force of gravity. In this embodiment, it will also be appreciated that the stored potential energy may be referred to as gravitational potential energy.

In this particular embodiment, the fundamental equation describing the amount of gravitational potential energy stored by the subterranean energy storage system (100) via the transfer of the pseudo fluid (70) through the transport shaft (20) from the first storage tank (40) to the second storage tank (50) is defined by Equation 1:

$$E = m \times g \times h$$

Referring to Equation 1; E denotes the stored potential energy in Joules, m denotes the mass in kilograms translated by the transfer of the pseudo fluid through the transport shaft (20), g denotes the acceleration due to gravity in meters/second/second, and h denotes the vertical distance spanned by the transport shaft (20) being essentially the distance from the second storage tank (50) to the first storage tank (40) (and vice versa) in meters. It will be appreciated that, as the acceleration due to gravity g is essentially fixed, the parameters of Equation 1 that remain to be exploited to achieve maximum stored potential energy E, is the mass in translated by the transfer of the pseudo fluid (70) and the vertical distance h defined as the distance from the second storage tank (50) to the first storage tank (40). It will also be appreciated that the parameters of Equation 1 (F, m, g and h) may be of alternative but equivalent units of measure not disclosed herein. Thus, it will be appreciated, that in order to achieve maximum stored potential energy E, both the mass in of the pseudo fluid (70) and the distance h from the second storage tank (50) to the first storage tank (40) should be as large as possible.

In one embodiment, the pseudo fluid (70) may comprise high density material. The high density material may be particularly selected for use in the subterranean energy storage system (100), such that the transfer of the high density material via the at least one transport shaft (20) by the at least one continuous conveyor mechanism (10) between the first (40) and second (50) storage tanks results in maximizing the mass in to be translated, while keeping excavated volume and hence excavation cost low.

In this particular embodiment, the high density material may be spheres of a metal alloy (70), such as an alloy of iron, such as steel or other similar alloys of iron. In this way, the spheres of the metal alloy (70) may be particularly selected to maximize the mass in to be translated via the at least one transport shaft (20) by the at least one continuous conveyor mechanism (10). Additionally, the selection of the spheres of the metal alloy (70) may also be particularly selected with the objective of yielding a higher density (and thus mass) with respect to its cost.

In this particular embodiment, it will be appreciated that iron may be selected as the metal alloy (70) due to its abundance in nature, high density, and availability through existing supply chains to reduce cost. Advantageously, the iron used for the spheres of iron may be recycled/re-used iron, repurposed for use in the subterranean energy storage system (100) so as to reduce cost.

Additionally, in this particular embodiment where spheres of steel may be used as the metal alloy (70), advantageously, the spheres of steel may be recycled/re-used steel, repurposed for use in the subterranean energy storage system (100) so as to reduce cost. It will be appreciated that further alternative embodiments for the spheres of the metal alloy are envisaged beyond those disclosed, to achieve the desired effect of maximizing the mass m to be translated.

In the above embodiments, advantageously the subterranean energy storage system (100), via the use of the pseudo fluid (high density material/spheres of the metal alloy/spheres of iron/spheres of steel (70), may achieve maximum stored potential energy E.

Additionally, in the above embodiments, in the instance that the pseudo fluid are spheres of steel (70) and comprise a diameter between 4 to 10 mm, it will be appreciated that the spheres of steel (70) essentially flow like a fluid thereby simplifying the function of loading and unloading of the vessels (30) of the at least one continuous conveyor mechanism (10). This simplification is noted in operation of the subterranean energy storage system (100), whereby no stop/start of the at least one continuous conveyor mechanism (10) is required during loading or unloading of the spheres of steel (70), as the spheres (70) inherently have low individual inertia and are more easily accelerated to the speed of the continuous conveyor mechanism (10). An advantage of the use of spheres of steel (70) is that when compared to other potential pseudo fluid or high density material, such as gravel, there is no creation of dust or other particles that may hinder the fluidity of the pseudo fluid (70). Additionally, spheres of steel (70) used as the pseudo fluid do not have sharp edges, thereby mitigating the chance of exacerbating wear of the loading mechanism and vessels (30). Furthermore, the spheres of steel (70) may be coated in an oil or other lubricant, and may be plated in another metal or alloy so as to reduce the rate of corrosion of the steel spheres (70) to an acceptable level.

Additionally, in any one of the above embodiments, the spheres of the metal alloy (70) may be of one or more different sizes. In one example, where the spheres of the metal alloy (70) are all of one size, it may be estimated that the resultant random packing efficiency of the spheres is approximately 0.64. In an alternative example, where the spheres of the metal alloy (70) are of two or more different sizes, it will be appreciated that the resultant packing efficiency of the spheres is higher than if the spheres were all of one size. In this example, provided that the spheres of the metal alloy (70) are of two or more different sizes, it may be estimated that the resultant random packing efficiency of the spheres may be up to 0.75. Advantageously, the higher random packing efficiency provided by the use of spheres of the metal alloy of two or more different sizes provides the pseudo fluid (70) with a higher bulk density. Thus, preferably, the spheres of the metal alloy (70) are not comprised of spheres of a fixed size, so as to achieve the desired effect of maximizing the mass in to be translated while keeping excavated volume relatively lower.

Referring now to FIG. 1, in one embodiment, the second storage tank (50) may be located at a depth below the Earth's surface (110). In this way, provided that the second storage tank (50) is located above the first storage tank (40), advantageously the first (40) and second (50) storage tanks of the subterranean energy storage system (100) impose little to no visual/environmental footprint. In particular, to maximize the vertical distance h between the first (40) and the second (50) storage tanks, the second storage tank (50) may be positioned directly above the first storage tank (40). In an alternative embodiment, the second storage tank (50) may be located on or only partially below the Earth's surface (110). In this alternative embodiment, it will be appreciated that the location of the second storage tank (50) is such that the subterranean energy storage system (100) minimises its visual/environmental footprint.

In this particular embodiment, the first storage tank (40) may be at a depth greater than 100 m below the second storage tank (50). It will be appreciated that the greater the depth that the first storage tank (40) is positioned at below the second storage tank (50), the higher the vertical distance h to achieve maximum stored potential energy E. It will be further appreciated that the design and selection of the depth of the first storage tank (40) below the second storage tank (50) may be based on the location of the subterranean energy storage system (100) and the available subsurface geology. That is, the depth to which the Earth may be excavated to, for locating the subterranean energy storage system (100) below the Earth's surface (110), is limited by the subsurface rock properties and geological or environmental limitations. It will be appreciated that ideally the subterranean energy storage system (100) will be at a location below the Earth's surface (110) that is abundant in rock, as rock may provide a suitably strong structural foundation for supporting the first (40) and second (50) storage tanks at their respective depths.

In one embodiment, the at least one transport shaft (20) may comprise a casing (21). The casing (21) may comprise piping or tubing with an internal diameter capable of housing the at least one continuous conveyor mechanism (10) that extends through the at least one transport shaft (20). In this way, the casing (21) accommodates the at least one continuous conveyor mechanism (10), protecting it from excavated rock forming the at least one transport shaft (20). It will be appreciated that the casing (21) may be cemented in place by known methods for securing and structurally supporting casing/piping/tubing in subterranean settings. In this particular embodiment, the at least one transport shaft (20) permits the at least one continuous conveyor mechanism (10) to be movable between the first (40) and second (50) storage tanks to transfer the pseudo fluid.

Figure 2:
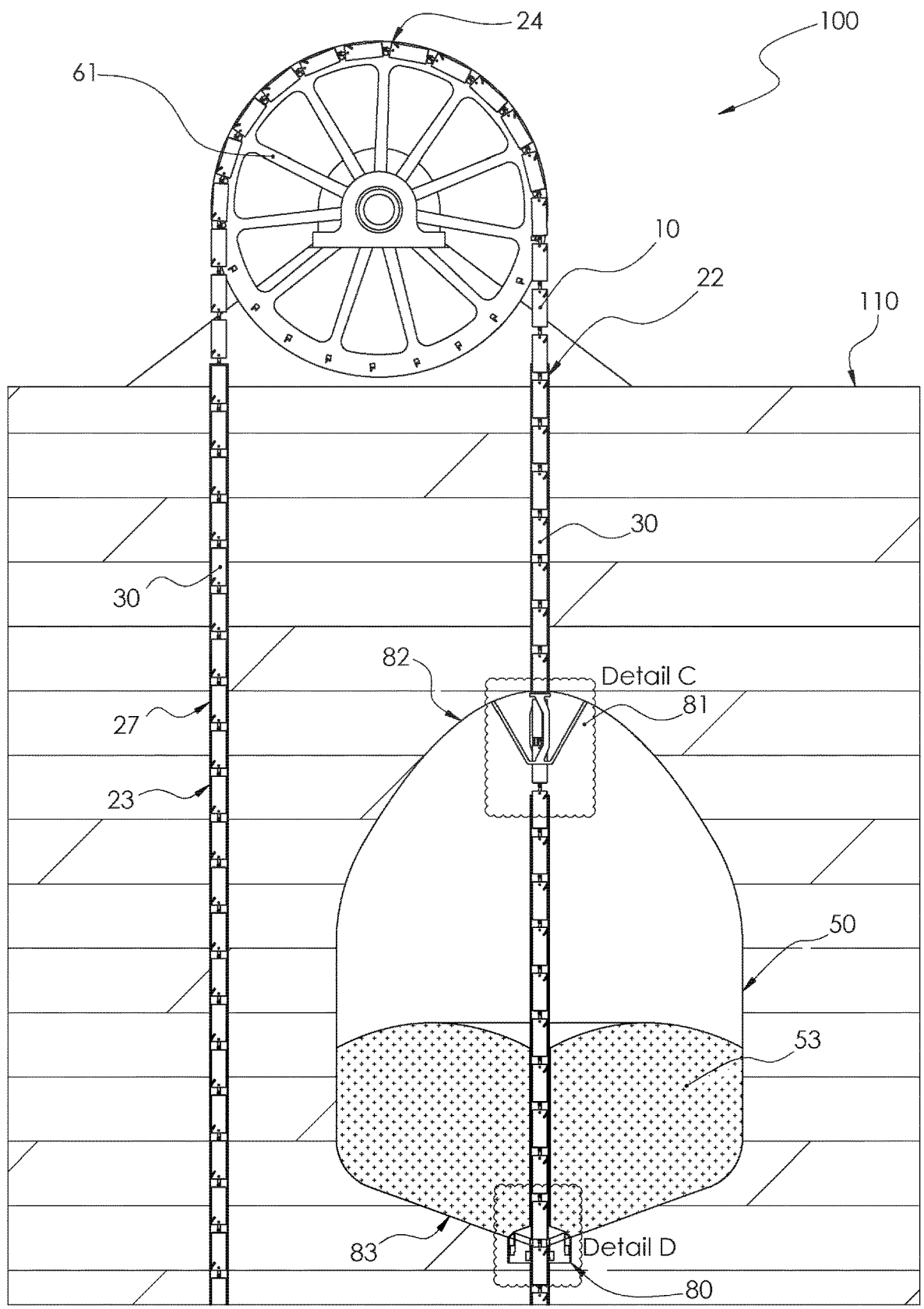
FIG. 2 is a schematic plan diagram illustrating Detail A of the subterranean energy storage system of FIG. 1.
Figure 3:
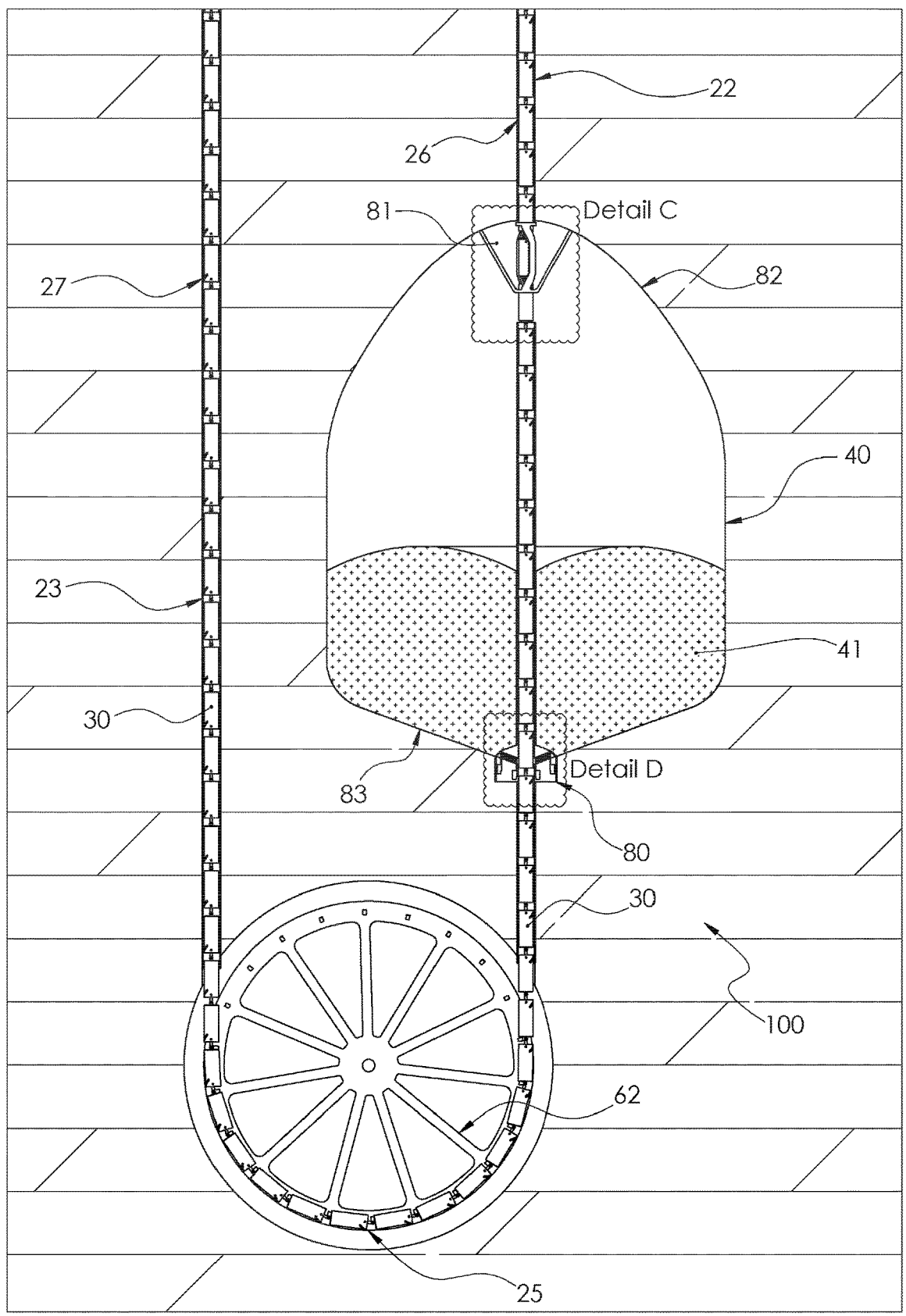
FIG. 3 is a schematic plan diagram illustrating Detail B of the subterranean energy storage system of FIG. 1.

In an alternative embodiment, referring now to FIGS. 2 and 3, there may be a first transport shaft (22) and a second transport shaft (23). 111 this embodiment, the first (22) and second (23) transport shafts may be in communication with one another at their respective top (24) and bottom (25) portions, said top (24) and bottom (25) portions of the vertical shafts (22, 23) being located above and below the second (50) and first (40) storage tanks respectively. In this way, the at least one continuous conveyor mechanism (10) may be accommodated in both the first (22) and second (23) transport shafts, in a way such that a first portion of the at least one continuous conveyor mechanism (10) is accommodated within the first transport shaft (22), and a second portion of the at least one continuous conveyor mechanism (10) is accommodated within the second transport shaft (23), so as to form a loop as illustrated in FIGS. 2 and 3.

In this embodiment, each of the first (22) and second (23) transport shafts may comprise respective first and second casings (26 and 27), where the casing for each of the first (22) and second (23) transport shafts may comprise piping or tubing with an internal diameter capable of housing the at least one continuous conveyor mechanism (10) that is accommodated in both the first (22) and second (23) transport shafts. It will be appreciated that the first and second casings (26 and 27) may be cemented in place by known methods for securing and structurally supporting casing/piping/tubing in subterranean settings.

Additionally, in this embodiment, the first transport shaft (22) may permit the first portion of the at least one continuous conveyor mechanism (10) to be movable between the first (40) and second (50) storage tanks to transfer the pseudo fluid (70), and the second transport shaft (23) may prevent the at least one continuous conveyor mechanism (10) from communicating with the first (40) and second (50) storage tanks. In this way, the subterranean energy storage system (100) stores potential energy by way of the first portion of the at least one continuous conveyor mechanism (10) comprising the plurality of vessels (30) containing the pseudo fluid (70) being transferred from the first storage tank (40) to the second storage tank (50) via the first transport shaft (22). Additionally, as the plurality of vessels (30) of the at least one continuous conveyor mechanism (10) passes through the second storage tank (50), the plurality of vessels (30) of the second portion of the at least one continuous conveyor mechanism (10) in the second transport shaft (23) do not comprise the pseudo fluid (70). In this way, the combination of the first (22) and second (23) transport shafts, the first and second portions of the at least one continuous conveyor mechanism (10) form the loop as illustrated in FIGS. 2 and 3.

Furthermore, in this embodiment, it will be appreciated that the subterranean energy storage system (100) may release the stored potential energy by the plurality of vessels (30) from the second portion of the at least one continuous conveyor mechanism (10) accommodated in the second transport shaft (23) by being movable to transfer the pseudo fluid (70) from the second storage tank (50) to the first storage tank (40) via the first transport shaft (22).

In any one of the above embodiments, any one of the casings (21, 26 and 27) described in relation to their respective transport shafts (20, 22, 23) may comprise a diameter of up to 0.3 m to accommodate the at least one continuous conveyor mechanism (10). In this way, any one of the transport shafts (20, 22, 23) may be drilled by using existing techniques readily available for drilling vertical holes, for example by drilling rigs used in the oil and gas industry and their associated drilling equipment.

In any one of the above embodiments, the at least one transport shaft (20), or any one of the first (22) or second (23) transport shafts may comprise a width to height aspect ratio of 1:2000 to 1:20,000. In this way, any one of the transport shafts (20, 22, 23) may have a length to diameter ratio of between 2000 and 20,000, thereby advantageously maximising the height (h) achieved while minimising the excavated volume to excavate the transport shafts (20, 22, 23).

In any one of the above embodiments, any one of the first (40) or second (50) storage tanks may comprise a width to height aspect ratio of 20:1 to 1:20. In this way, locating any one of the first (40) or second (50) storage tanks at the depth below the Earth's surface (110) may advantageously minimise the excavated volume of rock required. It will be appreciated that the width to height aspect ratio of the first (40) and second (50) storage tanks may be selected based on the capabilities of the equipment used for the excavations, the geology of the location at which the subterranean energy storage system (100) is to be installed, the financial constraints of the system (100) and a number of other factors are also envisaged.

In one embodiment, for the subterranean energy storage system (100) to store potential energy, the energy transfer means (60), in use, transfers power derived from a source of renewable energy to the at least one continuous conveyor mechanism (10) to transfer the pseudo fluid (70) from the first storage tank (40) to the second storage tank (50). It will be appreciated that the source of renewable energy may comprise wind, wave, geothermal or solar energies.

In this particular embodiment, it will be appreciated that during times when peak energy generation from the renewable source does not coincide with peak demand for electrical power, this excess renewable energy generated may be diverted to the energy transfer means (60) of the subterranean energy storage system (100) to store the excess energy as potential energy. The stored potential energy of the subterranean energy storage system (100) may then advantageously be released by transfer of the pseudo fluid (70) from the second storage tank (50) to the first storage tank (40) and via the energy transfer means (60) supplying the energy grid during periods during which energy demand outstrips supply from the renewable source.

In an alternative embodiment, for the subterranean energy storage system (100) to store potential energy, the energy transfer means (60), in use, transfers power derived from electrical or hydraulic energy to the at least one continuous conveyor mechanism (10) to transfer the pseudo fluid (70) from the first storage tank (40) to the second storage tank (50). In this way, the energy transfer means (60) may be driven by imported power systems of any combination of electric or hydraulic energy to store potential energy via the transfer of the pseudo fluid (70).

Figure 6:
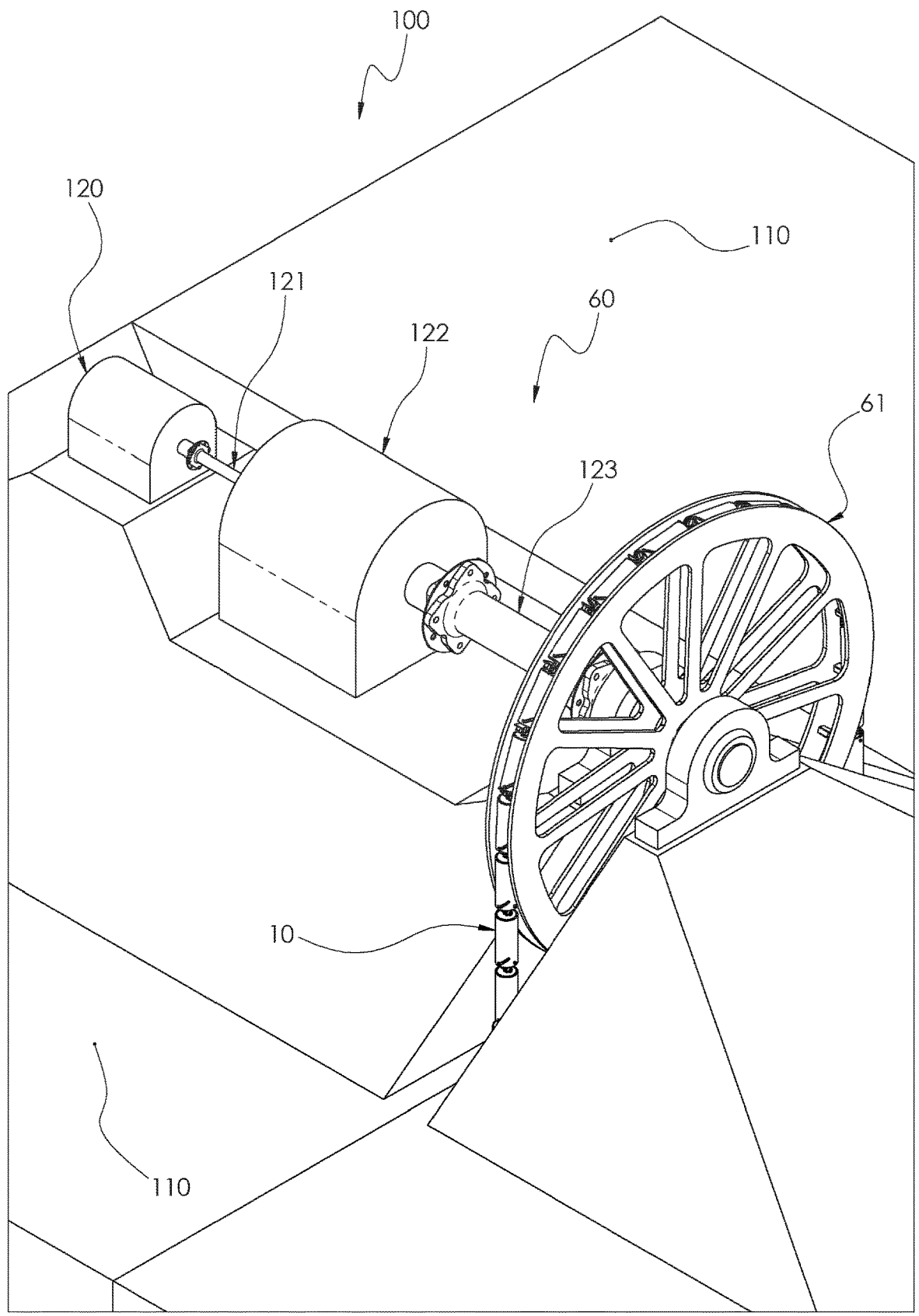
FIG. 6 is a perspective view of the subterranean energy storage system above the Earth.

In one embodiment, referring now to FIG. 6, the released potential energy may be converted to electrical or hydraulic energy. In this way, the energy transfer means (60) may drive a motor or generator (120), via known drive mechanisms. For example, the drive mechanism may include the motor or generator (120) connected via a low torque high speed shaft (121) to a gearbox (122). The gearbox (122) may then be connected via a high torque low speed shaft (123) to the subterranean energy storage system (100). In this way, in this particular embodiment, the subterranean energy storage system (100) may store or release potential energy via the drive mechanism.

In this embodiment, the motor or generator (120) may be connected to power export systems to release and store the potential energy of the subterranean energy storage system (100). Thus, it will be appreciated that the subterranean energy storage system (100) may export the stored potential energy to any type of energy export medium depending on the designated energy medium.

In an alternative embodiment, the subterranean energy storage system (100) may be directly connected to power export systems by alternate means to release and store the potential energy of the subterranean energy storage system (100). In this way, advantageously, a person skilled in the art will appreciate that the subterranean energy storage system (100) is versatile in that it is a standalone large scale energy storage system that may be adapted to import and export stored energy under a number of arrangements.

In one embodiment, referring now to FIG. 6, the energy transfer means (60) may be positioned above the second storage tank (50). In this way, the energy transfer means (60) may either be located above (as illustrated in the Figures) or below (not shown) the Earth's surface (110), based on the location of the second storage tank (50). Advantageously, provided that the second storage tank (50) is located below the Earth's surface, the subterranean energy storage system (100) is substantially located below the Earth's surface and minimises its visual impact at its location.

In one embodiment, referring now to any one of FIGS. 2, 3 and 6, the energy transfer means (60) may comprise a first sprocket (61) positioned above the second storage tank (50), and a second sprocket (62) positioned below the first storage tank (40). In this way, the first (61) and second (62) sprockets may co-operate to transfer the pseudo fluid (70) via the at least one continuous conveyor mechanism (10) between the first (40) and second (50) storage tanks.

In this particular embodiment, the first sprocket (61) may be positioned at the top portion (24) of the first (22) and second (23) transport shaft (20), and the second sprocket (62) may be positioned at the bottom portion (25) of the first (22) and second (23) transport shafts. In this way, the first (61) and second (62) sprockets of the energy transfer means (60) form part of the loop illustrated in FIGS. 2 and 3 of the at least one continuous conveyor mechanism (10).

In this particular embodiment, referring to FIG. 6, the first sprocket (61) may be positioned such that the high torque low speed shaft (123) of the drive mechanism interfaces with the first sprocket (61) such that the subterranean energy storage system (100) may store or release potential energy via the drive mechanism.

Additionally, in this particular embodiment, the at least one conveyor mechanism (10) may comprise one or more profiles (11) along the length of the at least one conveyor mechanism (10), wherein the one or more profiles (11) may permit the at least one conveyor mechanism (10) to engage one or more teeth profiles (63) of either of the first (61) or second (62) sprockets. In this way, the interaction between the one or more profiles (11) of the at least one continuous conveyor mechanism (10) and the one or more teeth profiles (63) of either of the first (61) or second (62) sprockets, may co-operate to transfer the pseudo fluid (70) via the at least one continuous conveyor mechanism (10) between the first (40) and second (50) storage tanks.

Figure 11:
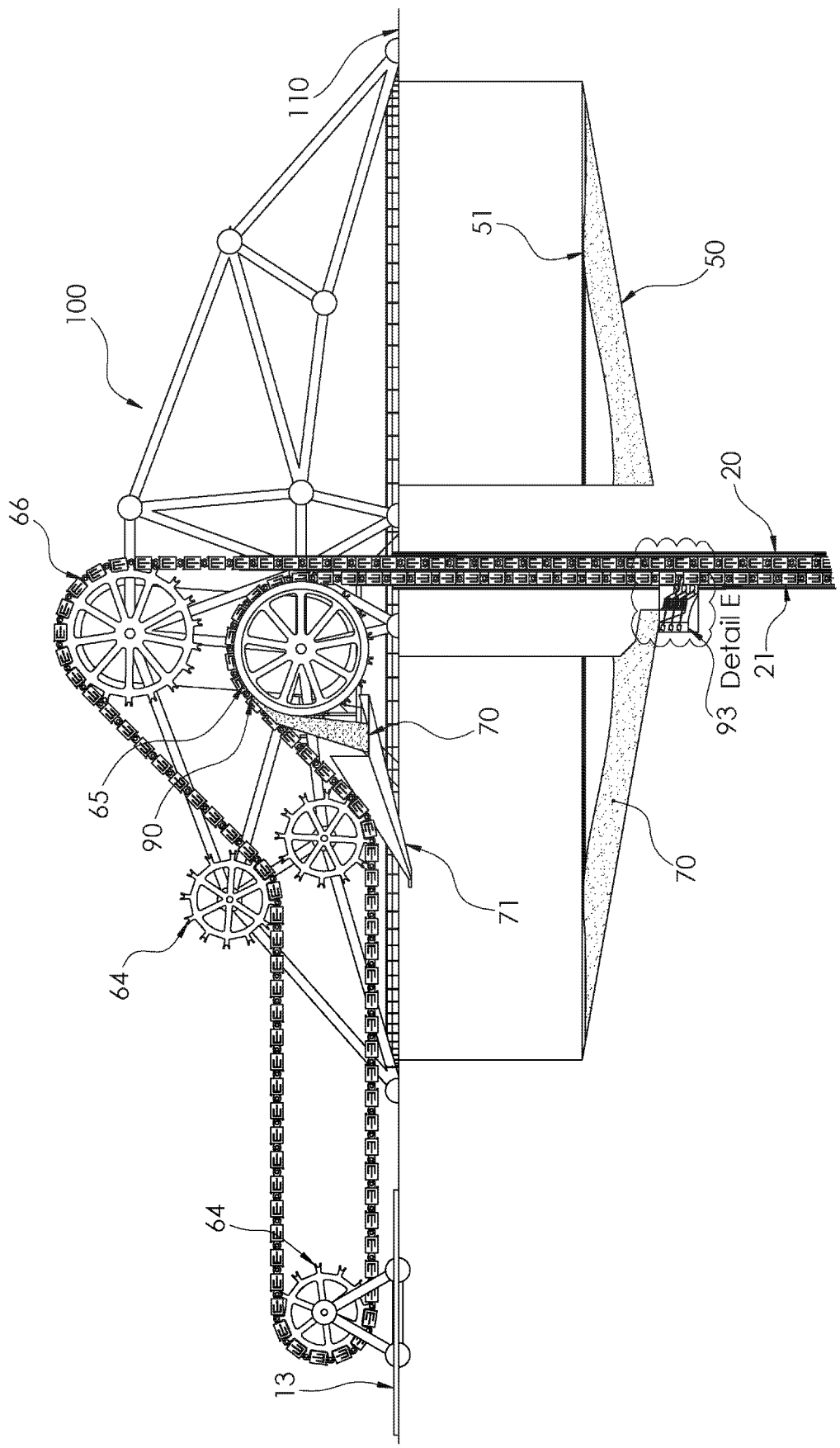
FIG. 11 is a schematic plan diagram illustrating a sprocket arrangement above the Earth's surface.
Figure 12:
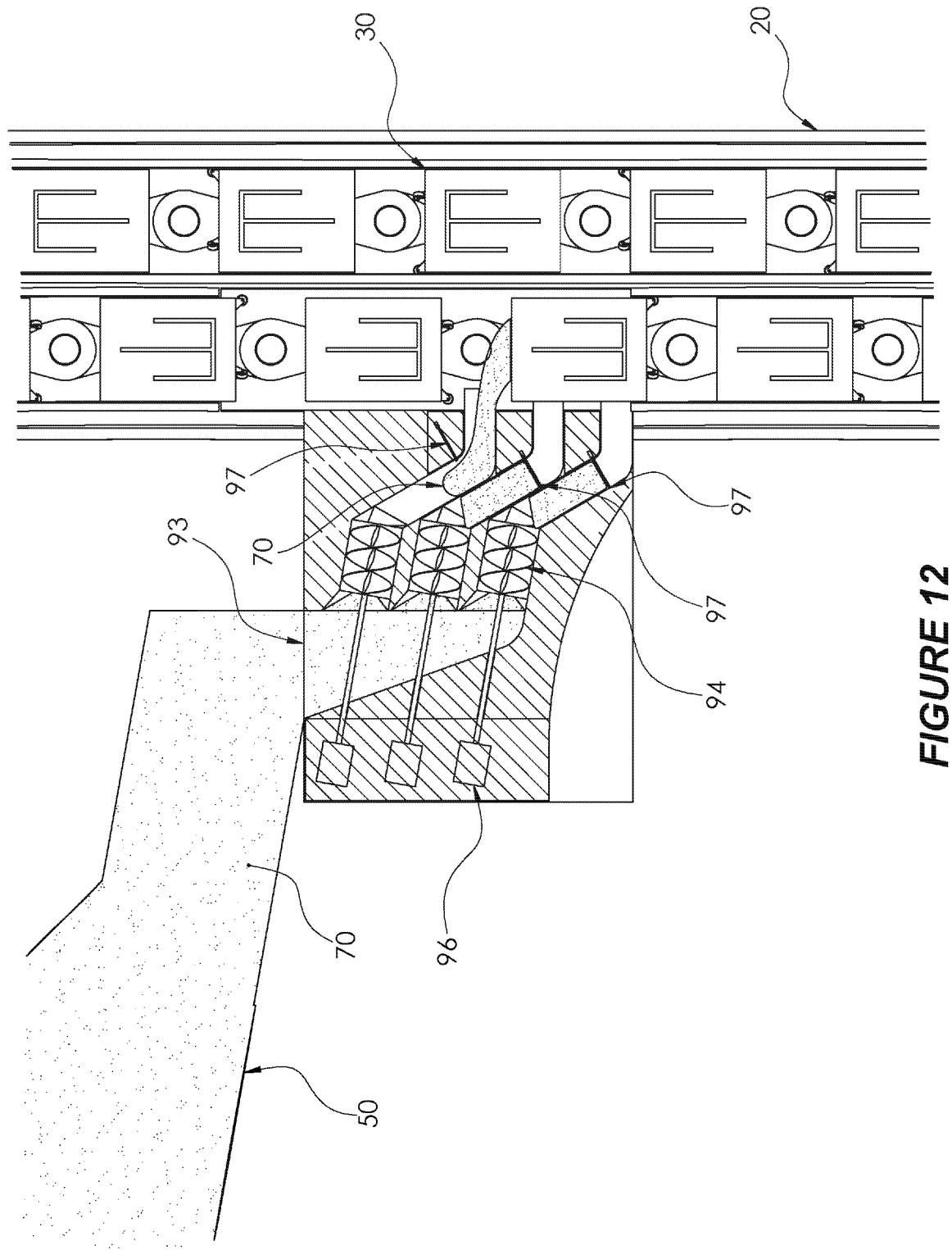
FIG. 12 is a schematic plan illustrating Detail E of the subterranean energy storage system of FIG. 11.

In an alternative embodiment, referring now to FIGS. 11 and 12, the first sprocket (61) positioned at the top portion (24) of the transport shaft (20) may be replaced by a system of sprockets (64), wherein the system of sprockets (64) is located on the Earth's surface (110), and comprises a plurality of sprockets that are sized and arranged within the system (64) so as to form part of the energy transfer means (60) and the loop of the at least one continuous conveyor mechanism (10). The arrangement of the plurality of sprockets within the system (64) may be such that two or more sprockets within the system (64) are suspended over the transport shaft (20) and are linked together via a gearbox (122) that couples the motion of the two driven sprockets in opposite directions. In this way, the gearbox coupled to the two driven sprockets allows for trimming of the at least one continuous conveyor mechanism (10) to thereby adjusting its total suspended length as required. An advantage of the two coupled sprockets and the gearbox coupled thereto is that the section of the continuous conveyor mechanism (10)

above the Earth's surface (110) is without significant tension. That is to say, if a particular section of the continuous conveyor mechanism (10) requires repair or replacement, such as one or more of the vessels (30), this can be readily performed due to the lower tension in the continuous conveyor mechanism (10) at the Earth's surface (110). An additional advantage provided by the plurality of sprockets of the system of sprockets (64), is that the at least one continuous conveyor mechanism (10) may be routed or directed between the various sprockets for both maintenance and inspection purposes. It will be appreciated, although not illustrated, that the second sprocket (62) at the bottom portion (25) of the at least one transport shaft (20) may also be replaced by a similar system of sprockets (not illustrated) so as to provide the features and advantages disclosed above.

Additionally, in any one of the above embodiments, it will be appreciated that for the subterranean energy storage system (100) to store potential energy, the energy transfer means (60), in use, may transfer power derived from the source of renewable energy, or electrical or hydraulic energy via the drive mechanism to the first sprocket (61) followed by transfer to the at least one continuous conveyor mechanism (10) to transfer the pseudo fluid (70) from the first storage tank (40) to the second storage tank (50).

Also in this particular embodiment, it will be appreciated that for the subterranean energy storage system (100) to release stored potential energy, the energy transfer means (60), in use, may release the stored potential energy by the transfer of the pseudo fluid (70) from the second storage tank (50) to the first storage tank (40), the transfer moving the at least one continuous conveyor mechanism (10) and thereby driving the first (61) and second (61) sprockets, whereby the first sprocket (61) is connected to the energy transfer means (60).

Furthermore, in this particular embodiment, it will be appreciated that a transport efficiency of the at least one continuous conveyor mechanism (10) may be increased with increasing a pitch of the first (61) and/or second (62) sprockets. In this way, any unused space between the plurality of vessels (30) of the at least one continuous conveyor mechanism (10) may be minimised, thereby further increasing the transport efficiency of the subterranean energy storage system (100). Additionally, increasing the pitch of the first (61) and/or second (62) sprockets may in effect increase acceleration and jerk actions experienced by the at least one continuous conveyor mechanism (10), in use, may increase mass and moment of inertia experienced by the plurality of vessels (30) of the at least one continuous conveyor mechanism (10). In this way, advantageously increasing the efficiency by which the at least one continuous conveyor mechanism (10) transfers the pseudo fluid (70) via the plurality of vessels (30) between the first (40) and second (50) storage tanks (i.e. an inherent advantage of increasing the pitch of the first (61) and/or second (62) sprockets is improved transport efficiency of the pseudo fluid (70) by the at least one continuous conveyor mechanism (10)). It will also be appreciated, in this particular embodiment, that the pitch of the first (61) and/or second (62) sprockets may be equal to the pitch of the at least one continuous conveyor mechanism (10).

In alternative embodiments, the energy transfer means (60) may comprise an auxiliary chain and sprocket arrangement (not shown) positioned on the length along the at least one continuous conveyor mechanism (10) between the first (40) and second (50) storage tanks. In this way, advantageously the auxiliary chain and sprocket arrangement may provide an alternative means of transferring mechanical power between the energy transfer means (60) and the at least one continuous conveyor mechanism (10), which may yield longer life of the at least one continuous conveyor mechanism (10), a higher transfer/transmission speed for the conveyor mechanism (10), and allow for the use of a cheaper and more efficient conveyor mechanism (10) design.

In this particular embodiment, the auxiliary chain and sprocket arrangement may comprise a plurality of conveyor support tabs (not shown) for engaging one or more profiles (11) along the length of the at least one conveyor mechanism (10). It will be appreciated that the one or more profiles (11) may be positioned along the length of the at least one conveyor mechanism (10) such that they are between each of the plurality of vessels (30) arranged along the length of the at least one continuous conveyor mechanism (10).

Figure 7:
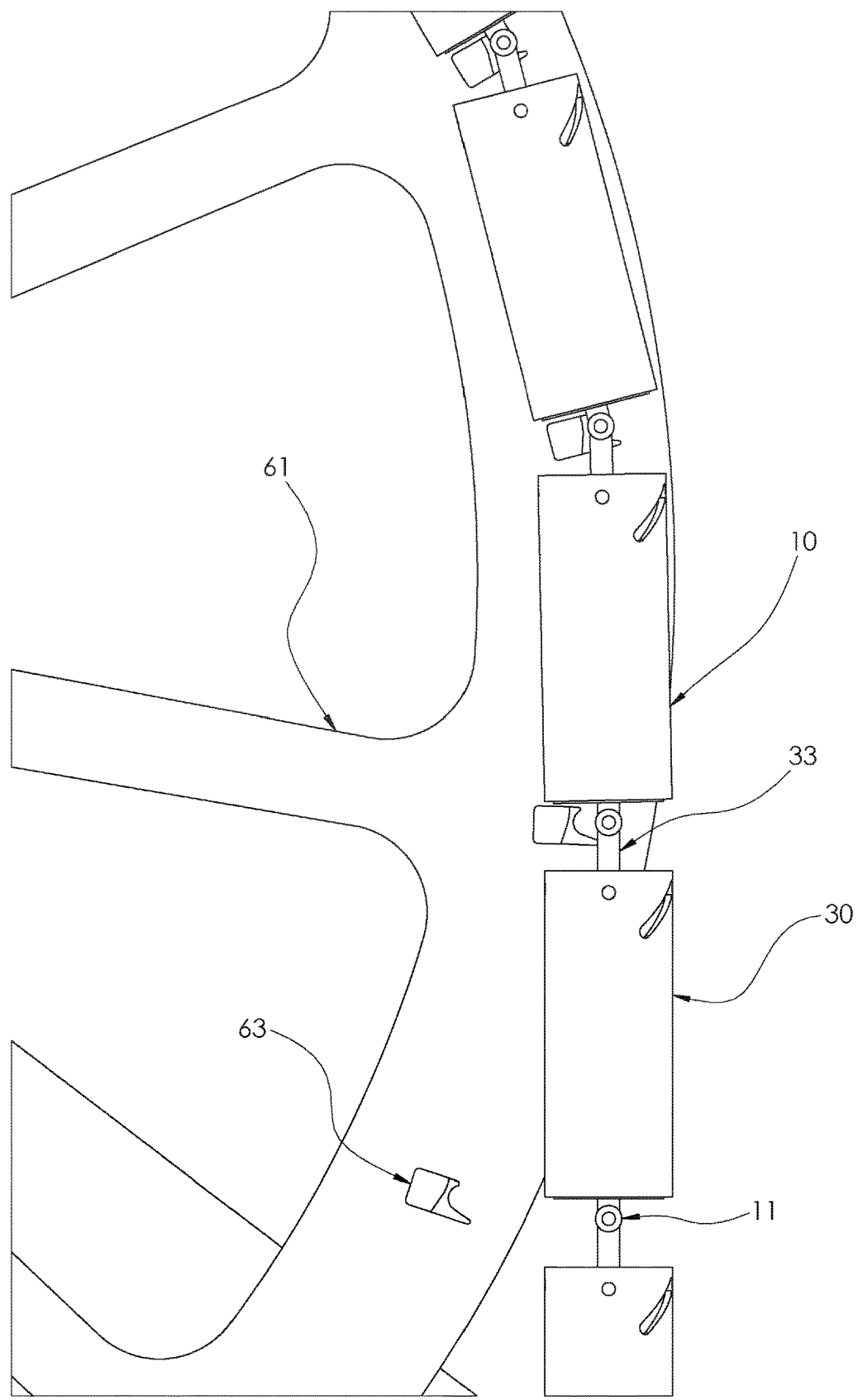
FIG. 7 is a schematic plan diagram illustrating a first sprocket of the subterranean energy storage system of any one of the Figures and a portion of at least one continuous conveyor mechanism.

In any one of the above embodiments, the plurality of vessels (30) may be arranged along an entire length of the at least one continuous conveyor mechanism (10), as illustrated in the Figures. In this way, the plurality of vessels (30) may essentially form links of the at least one continuous conveyor mechanism (10), and advantageously each of the links (i.e. the plurality of vessels (30)) may be optimally configured to transfer the pseudo fluid (70) through any one of the transport shafts (20, 22) between the first storage tank (40) and the second storage tank (50). Each of the links (i.e. the plurality of vessels (30)) may include corresponding central support structures (33), whereby the central support structures (33) allow continuous between a pair of vessels (30) so as to form the links that in turn form the at least one continuous conveyor mechanism (10). In this embodiment, the one or more continuous profiles (11) of the at least one continuous conveyor mechanism (10) may be positioned on the central support structure (33) as illustrated in FIG. 7.

In an alternative embodiment, the plurality of vessels (30) may be arranged along a selected length of the at least one continuous conveyor mechanism (10). In this way, the location of the plurality of vessels (30) along the selected length of the at least one continuous conveyor mechanism (10) may be selected to provide optimal power transmission efficiency, whilst minimising the bending radius of the loop formed by the at least one continuous conveyor mechanism (10) as illustrated in the Figures. In this particular embodiment, sections of the at least one continuous conveyor mechanism (10) that do not comprise the plurality of vessels (30), may comprise any one or more of links, cabling, bearings or sprockets to complete the at least one continuous conveyor mechanism (10) to form the loop as illustrated in the Figures.

In any one of the above embodiments, it will be appreciated that the at least one continuous conveyor mechanism (10) and its composition is selected for its high strength and its ability to bend to desired radii as per the design of the subterranean energy storage system (100). Additionally, it will be appreciated that the at least one continuous conveyor mechanism (10) and its composition is selected for its suitability to handle heavy loads, and ability to transfer the high density material at high flow rates. Those skilled in the art will appreciate that the continuous conveyor mechanism's (10) "conveyor-like" design makes it ideal for the subterranean energy storage system (100) disclosed herein, particularly when comparing other conveyor type mechanisms, that would not be suitable to handle heavy loads or have the ability to transfer the high density material at reasonable flow rates with similar cross sectional design constraints of the continuous conveyor mechanism (10). Referring to the cross sectional area of the continuous conveyor mechanism (10), it will be appreciated that it is advantageous to have as small a cross section as possible, so as to reduce the size of the at least one transport shaft (20, 22), thereby reducing the cost of excavation to produce said transport shafts (20, 22). Furthermore, the design and the material from which the continuous chain mechanism (10) is manufactured are formulated so as to minimise the weight of the continuous conveyor mechanism (10) while maintaining its suitability to handle heavy loads.

In any one of the above embodiments, the continuous conveyor mechanism (10) may comprise a chain. In an alternative embodiment, the continuous conveyor mechanism (10) may comprise a belt. It will be appreciated that in either embodiment, the continuous conveyor mechanism (10) is particularly selected for its high strength and its ability to bend to desired radii as per the design of the subterranean energy storage system (100).

Figure 13:
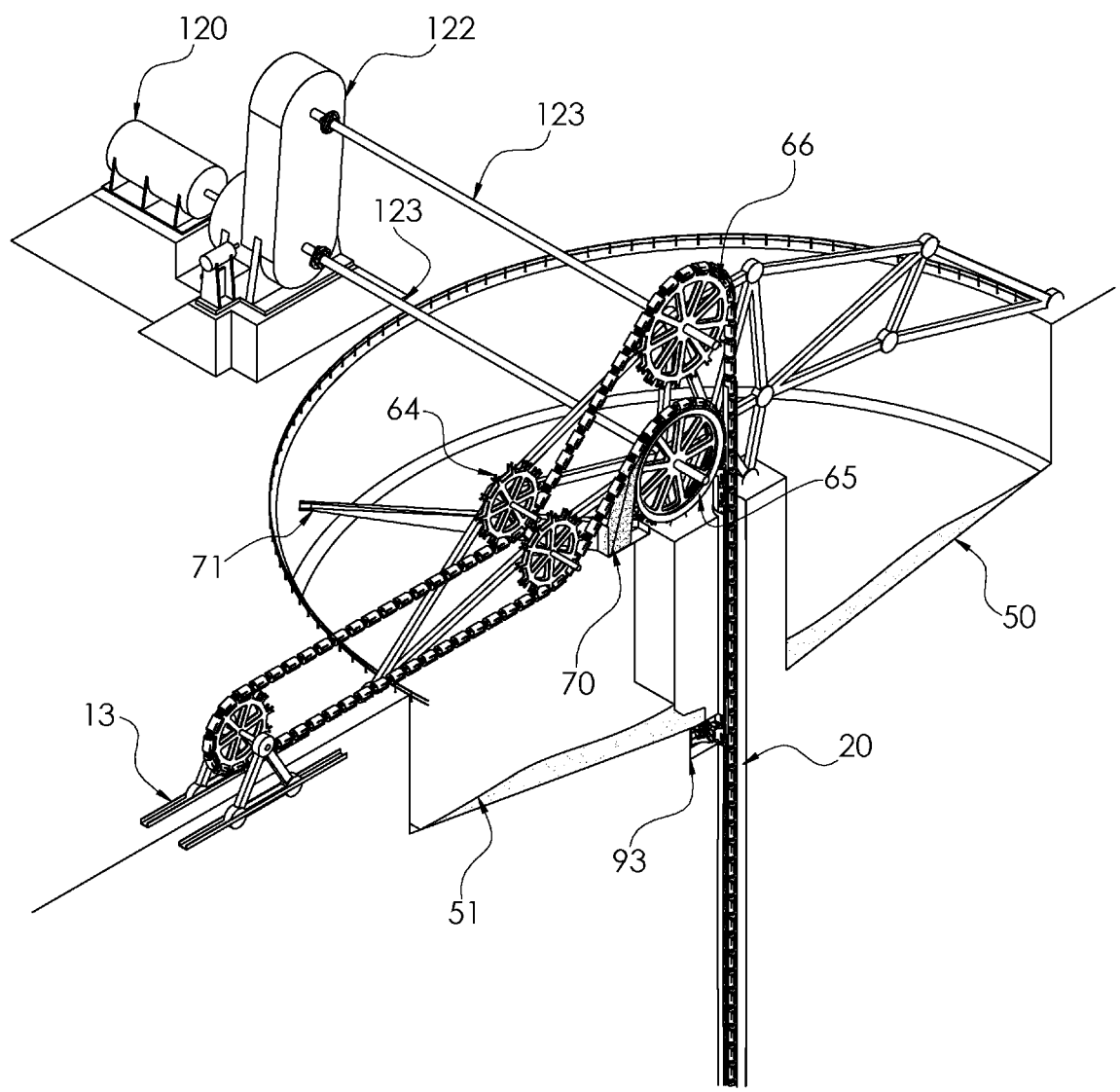
FIG. 13 is a perspective view of the sprocket arrangement above the Earth's surface of FIG. 11.

In any one of the above embodiments, and illustrated in FIGS. 11 and 13, the subterranean energy storage system (100) may further comprise an adjustment rail (13). The adjustment rail (13) being traversable and positioned on the Earth's surface (110), such that when connected to one or more of the sprockets of the system of sprockets (64), the adjustment rail (13) may traverse in a manner so as to adjust an amount of tension (or slack) in the at least one continuous conveyor mechanism (10). That is to say, a first direction in which the adjustment rail (13) traverses provides more slack to the at least one continuous conveyor mechanism (10) by changing the position of the sprocket (64) connected to the rail (13), and a second direction (opposite to the first) in which the adjustment rail (13) traverses provides more tension to the at least one continuous conveyor mechanism (10).

In any one of the above embodiments, referring now to FIGS. 2 to 5, it will be appreciated that the plurality of vessels (30) may operate similar to that of a "bucket mechanism" on the at least one continuous conveyor mechanism (10). In this way, each one of the vessels (30) of the plurality of vessels may transfer the pseudo fluid (70) between the storage tanks (40, 50) by travelling through a first entry/exit point (80) of the first storage tank (40) to load each one of the vessels (30) with the pseudo fluid (70) for transfer from a first storage tank filled volume (41). Each of the plurality of vessels (30), along the length of the at least one continuous conveyor mechanism (10), may then travel through a second entry/exit point (81) of the first storage tank (40) and continue through the at least one transport shaft (20) to a first entry/exit point (80) of the second storage tank (50). Each of the plurality of vessels (30), along the length of the at least one continuous conveyor mechanism (10) loaded with the pseudo fluid (70), may then release the contained pseudo fluid (70) into the second storage tank (50) to create a second storage tank filled volume (51), prior to travelling through a second entry/exit point (81) of the second storage tank (50). It will be appreciated that the first (80) and second (81) entry/exit points of the first (40) and second (50) storage tanks may be located at a position on a top (82) and bottom (83) of the respective first (40) and second (50) storage tanks. In one example, the first (80) and second (81) entry/exit points of the first (40) and second (50) storage tanks may be centrally aligned on the storage tanks' (40, 50) tops and bottoms (82, 83), such that the at least one continuous conveyor mechanism (10) and the plurality of vessels (30) travel therethrough.

In one embodiment, referring still to FIGS. 2 to 5, each of the plurality of vessels (30) may release the contained pseudo fluid (70) via an unloading mechanism (90), whereby the unloading mechanism (90) lifts an outer sleeve (31) of the vessel (30) relative to the at least one continuous conveyor mechanism (10). In this way, the outer sleeve (31) may be raised using a cam profile (91) of the unloading mechanism (90), whereby the cam profile (91) converts linear vertical motion of the at least one continuous conveyor mechanism (10) to rotational motion of the outer sleeve (31), thereby releasing the pseudo fluid (70) contained within the vessel (30) into the second storage tank (50). In this way, the released pseudo fluid (70) creates the second storage tank filled volume (51) of the second storage tank (50).

In this particular embodiment, referring to FIGS. 2 and 3, the unloading mechanism (90) may be located at the top (82) of the first (40) and second (50) storage tank. The unloading mechanism (90) may include one or more stiffening ribs (92), to both secure the unloading mechanism (90) at the top (82) of the first (40) and second (50) storage tanks, and to direct the plurality of vessels (30) of the at least one continuous conveyor mechanism (10) through the second entry/exit points (81) of the respective first (40) or second (50) storage tanks.

Figure 4:
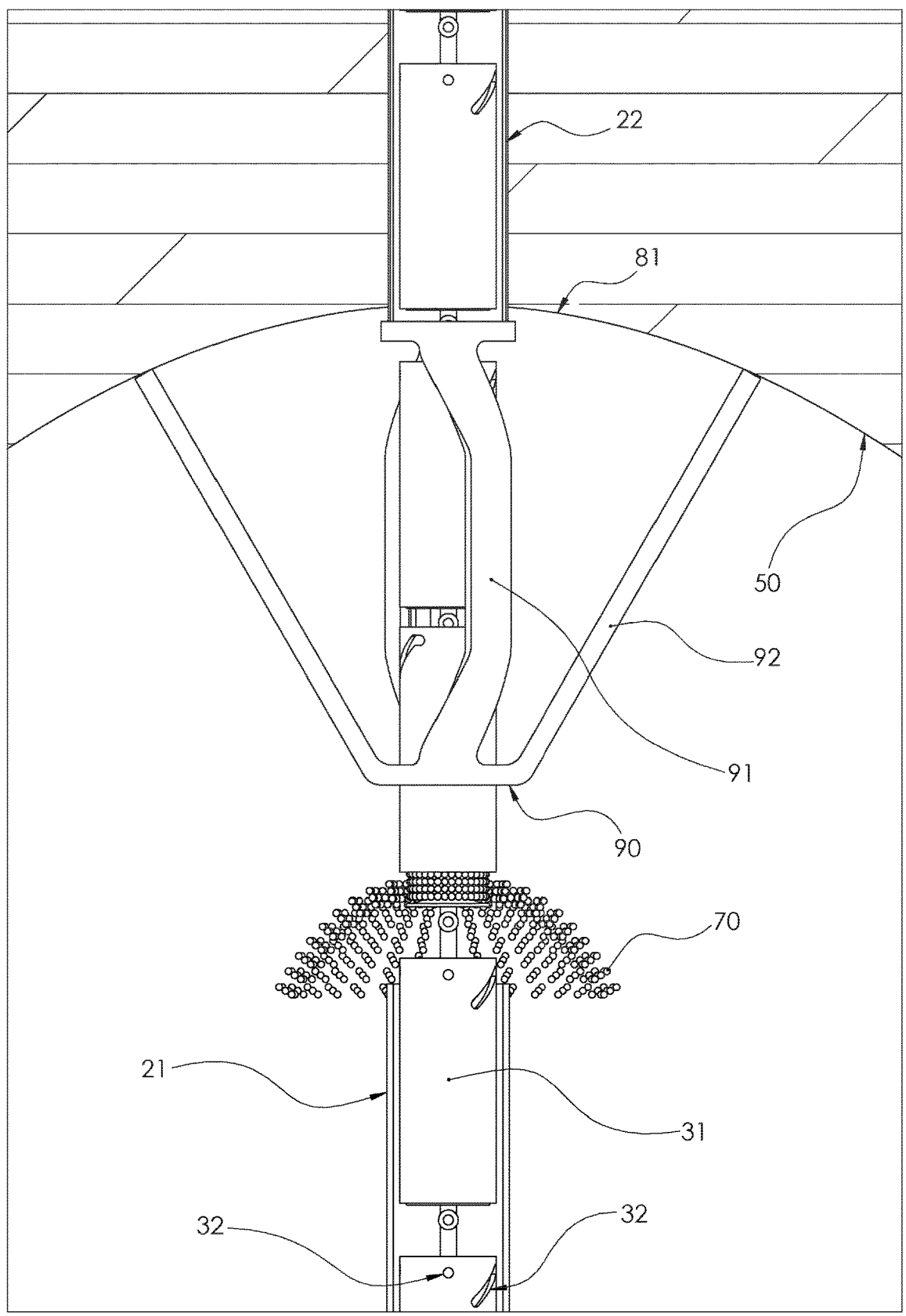
FIG. 4 is a schematic plan diagram illustrating Detail C of the subterranean energy storage system of FIGS. 2 and 3.
Figure 5:
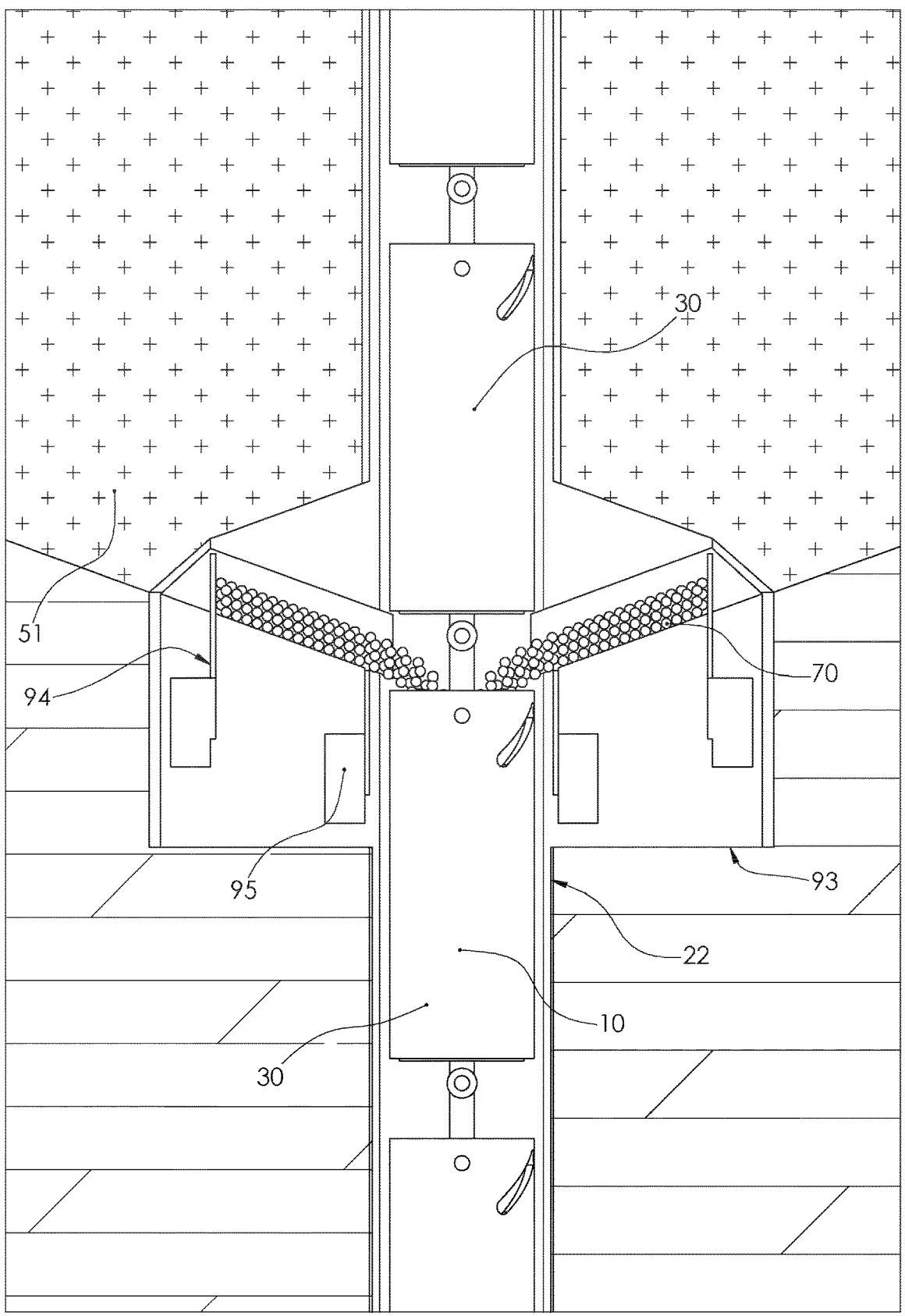
FIG. 5 is a schematic plan diagram illustrating Detail D of the subterranean energy storage system of FIGS. 2 and 3.

In one embodiment, with reference to FIGS. 4 and 7, each of the plurality of vessels (30) may comprise the central support structure (33), whereby the central support structure (33) supports each of the plurality of vessels (30) and their alignment with respect to the at least one continuous conveyor mechanism (10). In this particular embodiment, each of the plurality of vessels (30) may further comprise a two stage cam system (32), the two stage cam system (32) may engage with the cam profile (91) of the unloading mechanism (90) to allow for the pseudo fluid (70) loaded within the vessel (30) of the at least one continuous conveyor mechanism (10) to be released.

In an alternative embodiment, referring now to FIGS. 8 to 10 illustrating the alternative embodiment of a vessel (30') making up the plurality of vessels (30) discussed above, the vessel (30') comprises one or more central support structures (33') embedded within a portion of the vessel (30'), whereby the central support structures (33') supports each of the vessels (30') and their alignment with respect to the at least one continuous conveyor mechanism (10) and interconnects each of the vessels (30') within the continuous conveyor mechanism (10). In this alternative embodiment, the vessel (30') further comprises a body (34), an indicator (35) on the body (34), one or more rollers (36) on an underside (37) of the body (34), and an open end (38).

The indicator (35) being positioned on the body (34) of the vessel (30') such that it denotes the orientation of the vessel (30'). Referring particularly to FIGS. 8 and 9, the indicator (35) may for example, be a set of prongs directed toward the open end (38) of the vessel (30'). It will be appreciated that other indicators (35), such as arrows or the like are envisaged to serve the same purpose.

The one or more rollers (36) are positioned on the underside (37) of the body (34) such that they may engage the transport shaft (20) during transit, thereby advantageously directing/routing the vessel (30'), and thus the continuous conveyor mechanism (10) through any imperfections or tortuosity of the transport shaft (20). Additionally, the rollers (36) are circumferentially spaced around the underside (37) of the body (34) such that the rollers (36) are able to roll on the inside of the casing (21) of the transport shaft (20).

The opening (38) of the vessel (30') is sized and shaped such that the pseudo fluid (70) may be loaded and unloaded from within the vessel (30'). That is to say, at an upright or near upright position, the vessel (30') may be loaded with and carry the pseudo fluid (70) therein to be transported between the first (40) and second (50) storage tanks. It will be appreciated that as the vessel (30') is transported between the first (40) and second (50) storage tanks, the pseudo fluid (70) is emptied or unloaded when the vessel (70), and thus its opening (38), are at a downward or near downward position.

Figure 14:
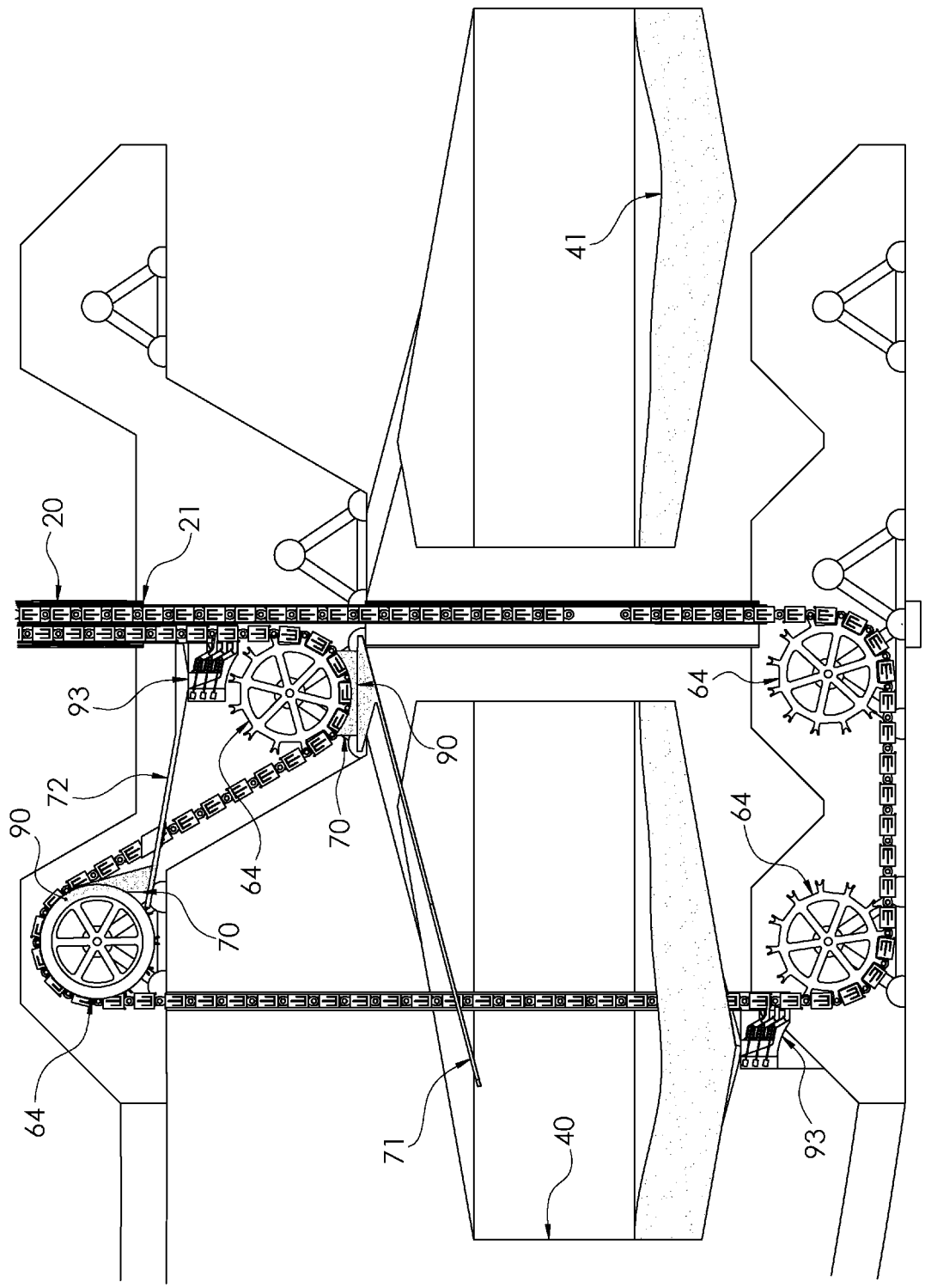
FIG. 14 is a schematic plan diagram illustrating a sprocket arrangement at a first storage tank below the Earth's surface.
Figure 15:
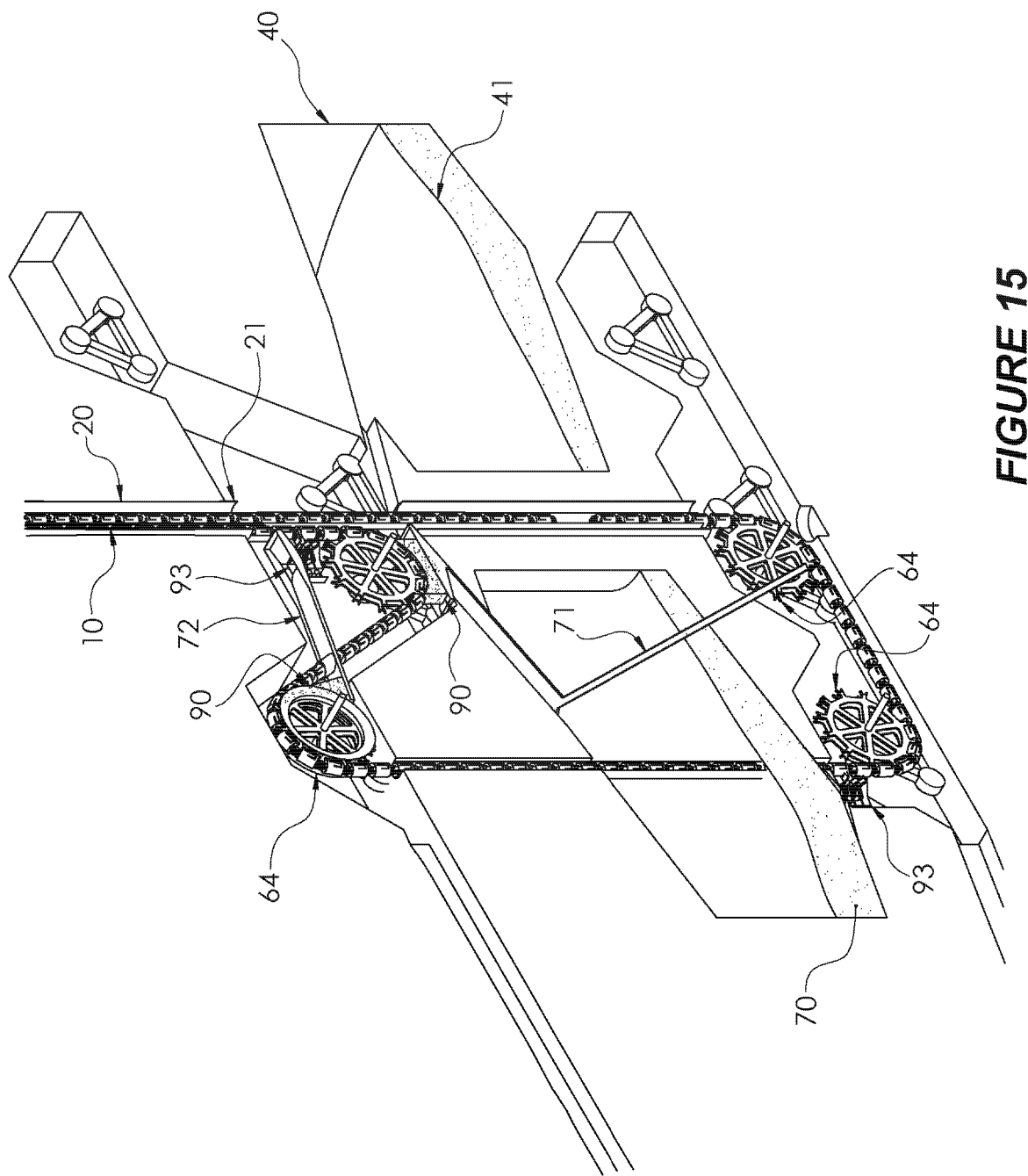
FIG. 15 is a perspective view of the sprocket arrangement at the first storage tank below the Earth's surface of FIG. 14.

The unloading of the pseudo fluid (70) from the vessel (30') is best shown in FIG. 11 at an unloading or overturning point (90). In this Figure, the unloaded pseudo fluid (70) from the vessel (30') at the overturning point (90), is directed via a channel (71), and may subsequently be diverted by a diverter channel (72) into the second storage tank (50). Similarly, referring now to FIG. 14, the first storage tank (40) also comprises the overturning point (90) at which the pseudo fluid (70) is unloaded from the vessel (30') by positioning the vessel (30') and its opening (38) at a downward or near downward position, and subsequently the pseudo fluid (70) is directed via the channel (71) and the diverter channel (72) directs and disperses the pseudo fluid (70) into the first storage tank (40). It will also be appreciated that the indicator (35) denotes or points toward the opening (38) of the vessel (30'), such that it is readily identifiable if the particular vessel (30') in the at least one continuous conveyor mechanism (10) is about to be loaded or unloaded with pseudo fluid (70).

It will be further appreciated that in this alternative vessel (30') embodiment, that the overturning means by which the vessels (30') are emptied may be considered an emptying mechanism, and advantageously reduces the structural complexity, and thereby cost, required to manufacture the vessel (30').

It will be further appreciated that hereinafter, the alternative embodiment of the vessel (30') and the embodiment of the plurality of vessels (30) discussed above, share similar characteristics by way in which they function and reference to either may be used interchangeably.

In either of the embodiments above referring to the vessels (30') and the plurality of vessels (30), it will be appreciated that the emptying mechanism (not shown) or the unloading mechanism (90) both function so as to release, empty, or unload the pseudo fluid (70) from the respective loaded vessel (30, 30').

In any one of the above embodiments referring to the plurality of vessels (30), it will be appreciated that although the vessels (30) operate similar to that of a "bucket mechanism", the vessels (30) are particularly designed, selected and manufactured so as to retain the high density material (i.e. the pseudo fluid (70)). That is to say, the vessels (30) advantageously transfer the high density material between the first (40) and second (50) storage tanks, through the at least one transport shaft (20) whilst mitigating the risk of spilling, expelling or losing the high density material during transit between the storage tanks (40, 50).

In one embodiment, the loading of the pseudo fluid (70) being transferred via the plurality of vessels (30) along the length of the at least one continuous conveyor mechanism (10) may be modulated by a loading mechanism (93) in each of the first (40) and second (50) storage tanks. In this way, the loading mechanism (93) may be located at a bottom (83) of either of the first (40) and second (50) storage tanks. Advantageously, the loading mechanism may (for example) direct the pseudo fluid (70) from either one of the first (40) or second (50) storage tanks filled volumes (41 and 51) into the plurality of vessels (30), thereby loading them as the at least one continuous conveyor mechanism (10) travels through the storage tanks (40, 50).

In this particular embodiment, the loading mechanism (93) may control the pseudo fluid (70) via an inner (94) and an outer (95) gate mechanisms, which may actuate as the plurality of vessels (30) of the at least one continuous conveyor mechanism (10) travels through the loading mechanism (93) allowing the loading of the plurality of vessels (30) with the pseudo fluid (70) from either one of the first (40) or second (50) storage tanks filled volumes (41 and 51) into the plurality of vessels (30).

In an alternative embodiment, referring now to FIGS. 11 to 15, an alternative loading mechanism (93) is illustrated, and comprises one or more augers (94), one or more gates (97) for each of the augers (94), and one or more motors (96) operatively associated with each of the augers (94) to impart drive to said auger (94). The one or more augers (94), in use, being able to modulate the quantity of the pseudo fluid (70) in the or each of the storage tanks (40, 50), such that a controlled volume of the pseudo fluid (70) is loaded into the vessels (30) along the length of the at least one continuous conveyor mechanism (10). The augers (94) being driven by its respective motor (96) so as to control the volume of pseudo fluid (70) being modulated, and to control said auger (94). The gate (97) for each auger (94) comprising an open position to allow the auger (94) to modulate the pseudo fluid (70) and load the vessel (30), and a closed position to prevent the loading of the vessel (30).

In any one of the above embodiments, it will be appreciated that power input/output (i.e. rate of storage of energy) of the subterranean energy storage system (100) is proportional to a velocity of the at least one continuous conveyor mechanism (10). A person skilled in the art will appreciate that the design goal of the loading mechanism (93) is to ensure that the at least one continuous conveyor mechanism (10) is loaded at an optimal rate so as to maximise power output. That is to say, the loading mechanism (93) is particularly selected and designed so as to load the vessels (30) of the continuous conveyor mechanism (10) at a sufficiently high rate to maximise power output of the subterranean energy storage system (100). It will be further appreciated that loading mechanisms (93) beyond those disclosed herein are envisaged, and are not limited to those described.

In an alternative embodiment to the above, it will be appreciated that the subterranean energy storage system (100) may comprise any number of continuous conveyor mechanisms (10) based on design requirements and/or constraints of the transfer of power to and from the subterranean energy storage system (100). In this way, it will be appreciated that where design and power load/input/output requirements permit, the subterranean energy storage system (100) may comprise two or more continuous conveyor mechanisms (not shown). Each of the continuous conveyor mechanisms may comprise a plurality of vessels (30) arranged along a length of each of the continuous conveyor mechanisms (10). The plurality of vessels (30) may be configured to transfer the pseudo fluid (70) through one or more transport shafts (not shown) from a first storage tank (40) to a second storage tank (50) located above the first storage tank (40) to store potential energy. Additionally, the pseudo fluid (70) may be transferred from the second storage tank (50) to the first storage tank (40) to release the stored potential energy. It will be further appreciated that further embodiments with various configurations of the subterranean energy storage system (100) design (such as including additional continuous conveyor mechanisms (10) and additional corresponding transport shafts (20)) are envisaged beyond those disclosed, to achieve the desired effect of storing and releasing potential energy.

In a further alternative embodiment to the above, it will be appreciated that the subterranean energy storage system (100) may be substantially located at a depth below the sea floor. The subterranean energy storage system (100) may, in use, transfer power via the energy transfer means (60) from a source of renewable energy such as wave/tidal energy to store potential energy. In this way, the subterranean energy storage system (100) may comprise the first storage tank (40) and the second storage tank (50) above the first storage tank (40), whereby the second storage tank (50) is located at a depth below the sea floor. It will be appreciated that this is an inherent advantage of the subterranean energy storage system (100), in that due to its minimal visual and structural footprint above the surface of the Earth (or the sea floor), the subterranean energy storage system (100) may be located within close proximity to sources from which it may derive power from and transfer/convert power/energy to.

In any one of the above embodiments, the material from which the at least one continuous conveyor mechanism (10) may be manufactured from is selected based on the h, the vertical distance spanned by the transport shaft (20), essentially the distance from the second storage tank (50) to the first storage tank (40). Considering h, the material selected to manufacture the at least one continuous conveyor mechanism will be assessed for its 'breaking length', being the maximum length that a section of material can be suspended vertically under the Earth's gravitational acceleration. Accordingly, the 'breaking length' of the material may dictate the absolute upper bound height that the vertical distance spanned by the transport shaft (20) may take. Thus, in order of increasing breaking length (i.e. conveyor applicability for use in larger vertical distances), the continuous conveyor mechanism may be manufactured of one or more of stainless steel, CrMo Steel (4130), aluminium alloy (7075-TG), glass fibre or carbon fibre. It will be appreciated that the material from which the continuous conveyor mechanism (10) may be manufactured from is not limited to those disclosed here, and that materials with higher breaking lengths are desirable for applications where the subterranean energy storage system (100) comprises at least one transport shaft (20) spanning large vertical distances.

Advantageously, the subterranean energy storage system (100) may outperform presently available large scale storage solutions (such as pumped hydro) by yielding higher revenue per project cost when trading on a volatile energy market. This advantage is apparent from the results of a parametric model factoring in the cost to build the subterranean energy storage system (100) as disclosed above, the resultant stored energy and power output, and historical price ($/MWh) data acquired from the national energy market.

It will be apparent from the above disclosure that one of the key problems that the subterranean energy storage system (100) disclosed herein provides a solution to, is how to store a substantial quantity of energy at a cost which is cheaper when considering the lifetime of the storage solution, than the presently available large scale storage solutions. Some of the common practical requirements considered when assessing the economics of a large scale energy storage solution are:

1. That it is at least capable of achieving E=1 GWh of energy storage;
2. That it is at least able to provide P=100 MW of power output; and
3. That the cost of the energy storage solution, when considering the lifetime of the solution, is cheaper (if not substantially cheaper) than the presently available storage solutions.

The subterranean energy storage system (100) of any one of the above embodiments addresses the common practical requirements. By way of example, the subterranean energy storage system (100) is designed so as to meet requirement 1 above by considering Equation 1, whereby the mass in (i.e. the high density material or pseudo fluid) and the height h (i.e. the distance between the first and second storage tanks) is sufficiently large. Requirements 2 and 3 above are met by the subterranean energy storage system (100) through its design and features, whereby the cross sectional area and the material from which the continuous conveyor mechanism (10) is manufactured are formulated so as to minimise the weight of the continuous conveyor mechanism (10) while maintaining its suitability to handle heavy loads and ability to achieve high material/fluid transfer rates.

Another presently available storage solution (to which the subterranean energy storage system (100) may be compared to) is the use of lithium ion batteries at a large scale. However, these can be costly to manufacture, difficult to source material for, have small, fixed number of discharge cycles before storage capacity degrades, thereby making the by-product/waste-product of the batteries contributors to harmful landfill.

An additional advantage of the subterranean energy storage system (100), in any one of the above embodiments, is that it imposes a low or no visual/environmental footprint on the environment within which it may be placed. This is due to the fact that the main components of the subterranean energy storage system (100) may be located at the depth below the Earth's surface (or the sea floor) and only a minimal amount of structure may be required at the surface (or seabed).

A further advantage of the subterranean energy storage system (100), in any one of the above embodiments, is that there is no requirement for geographical height and/or large quantities of water such as those resources required for presently available large scale energy storage systems (such as pumped storage hydroelectricity). Despite the lack of requirement for natural elevation differences, such elevation difference may still be used in conjunction with a decline tunnel, in a way which increases the depth from the surface while reducing the tunnel length (for example, digging underneath a mountain).

An exemplary method of construction of the subterranean energy storage system (100) of any one of the above embodiments, may comprise the steps of:

1. Drilling the at least one transport shaft (20), which may be completed with known oil field technologies and methodologies;
2. Installing casing (21) to the at least one transport shaft (20), which may be cemented in place with known oil field technologies and methodologies;

The casing (21) may be terminated at the depth of the first storage tank (40);

4. Rock crushers and/or water pump modules may then be lowered into the transport shafts, to the depth of the first storage tank (40);
5. Robotic drilling modules may then be used to radially drill the area for the first storage tank (40), thereby creating its capacity;
6. Explosive charges may then be used (as known in mining technologies and methodologies) and detonated to cause rock to fall into the rock crusher and water pump modules to circulate the rock back to surface in a recirculating water loop;
7. Steps (1) to (6) may be repeated at the depth of the second storage tank (50) above the first storage tank (40), such that the area and capacity of the second storage tank (50) is created; and
8. Rock bolts may be inserted, by the use of robots, into the walls of the first (40) and second (50) storage tanks to reduce the likelihood of hole collapse via techniques well known in underground mining operations; and
9. Components of the subterranean energy storage system (100) (such as the at least one continuous conveyor mechanism (10) and the energy transfer means (60)), may be partially or substantially constructed at the surface, and the remainder of each component may be constructed once positioned within the at least one transport shaft (20), first (40) and/or second (50) storage tanks.

It will be appreciated that the first (40) and second (50) storage tanks may take the shape of a spherical or wine glass shaped pressure vessel, and be constructed by the robotic drilling modules in the above method.

An alternative method of excavation of a location of the subterranean energy storage system (100) of at least some of the above embodiments may comprise the steps of:
1. Excavating a declining tunnel from the Earth's surface (110) down to a depth at which the first (50) lower storage tank is to be positioned;
2. The excavation process using raise boring or shaft sinking methods utilising well known mining technologies;
3. The first (40) lower storage tank comprising a geometry (not shown) other than the shape of a spherical or wine glass shaped pressure vessel (i.e. not a single large void), but rather being largely formed by maintaining natural underground rock support columns during excavation to support the structure of the first storage tank (40), thus advantageously reducing costs of reinforcing the geometry of the first storage tank (40); and
4. Lining both the first (40) and second (50) storage tanks with 'shotcrete' or similar concrete product to reduce and control the ingress of ground water into the storage tanks (40, 50), thereby advantageously isolating the pseudo fluid (70) from any ground water that may lead to corrosion.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope of the disclosure as set forth and defined by the following claims.

The invention claimed is:

1. A subterranean energy storage system comprising:
at least one continuous conveyor mechanism extending through at least one transport shaft, wherein the at least one continuous conveyor mechanism comprises a plurality of vessels arranged along a length of the at least one continuous conveyor mechanism, wherein the plurality of vessels are configured to transfer a pseudo fluid through the transport shaft from a first storage tank to a second storage tank located above the first storage tank to store potential energy, and the transfer of the pseudo fluid from the second storage tank to the first storage tank to release the stored potential energy, and wherein the first and second storage tanks each comprise at least one loading mechanism to load the pseudo fluid into each of the vessels, whereby each successive vessel for loading is loaded above another vessel, and at least one unloading mechanism to unload the pseudo fluid from each of the vessels; and
an energy transfer means, wherein the energy transfer means is operably connected to the at least one continuous conveyor mechanism to transfer power to and from the subterranean energy storage system.

2. The subterranean energy storage system of claim 1, wherein the second storage tank is located at a depth below the Earth's surface.

3. The subterranean energy storage system of claim 1, wherein the first storage tank is at a depth greater than 100 m below the second storage tank.

4. The subterranean energy storage system of claim 1, wherein the at least one transport shaft comprises a casing.

5. The subterranean energy storage system of claim 4, wherein the casing is configured to accommodate the at least one continuous conveyor mechanism.

6. The subterranean energy storage system of claim 1, wherein, to store potential energy, the energy transfer means, in use, transfers power derived from a source of renewable energy to the at least one continuous conveyor mechanism to transfer the pseudo fluid from the first storage tank to the second storage tank.

7. The subterranean energy storage system of claim 6, wherein the source of renewable energy comprises wind, wave or solar energy.

8. The subterranean energy storage system of claim 1, wherein, to store potential energy, the energy transfer means, in use, transfers power derived from electrical or hydraulic energy to the at least one continuous conveyor mechanism to transfer the pseudo fluid from the first storage tank to the second storage tank.

9. The subterranean energy storage system of claim 1, wherein the released potential energy is converted to electrical or hydraulic energy.

10. The subterranean energy storage system of claim 1, wherein the pseudo fluid comprises high density material.

11. The subterranean energy storage system of claim 10, wherein the high density material is comprised primarily of spheres of a metal alloy.

12. The subterranean energy storage system of claim 1, wherein the energy transfer means is positioned above the second storage tank.

13. The subterranean energy storage system of claim 12, wherein the energy transfer means is located above the Earth's surface.

14. The subterranean energy storage system of claim 1, wherein the energy transfer means comprises a first set of sprockets positioned above the second storage tank, and a second set of sprockets positioned proximal to the first storage tank.

15. The subterranean energy storage system of claim 14, wherein the second set of sprockets comprise one or more upper sprockets positioned above the first storage tank, and one or more lower sprockets positioned below the first storage tank.

16. The subterranean energy storage system of claim 14, wherein the first and second sets of sprockets co-operate to transfer the pseudo fluid via the at least one continuous conveyor mechanism between the first and second storage tanks.

17. The subterranean energy storage system of claim 14, wherein the at least one continuous conveyor mechanism comprises one or more profiles along the length of the at least one continuous conveyor mechanism, wherein the one or more profiles permit the at least one continuous conveyor mechanism to engage the first and second sets of sprockets.

18. The subterranean energy storage system of claim 17, wherein the one or more profiles are rollers along the length of the at least one continuous conveyor mechanism that permit engagement with the first and second set of sprockets.

19. The subterranean energy storage system of claim 1, wherein the energy transfer means comprises an auxiliary chain and sprocket arrangement positioned on the length along the at least one continuous conveyor mechanism between the first and second storage tanks.

20. The subterranean energy storage system of claim 19, wherein the auxiliary chain and sprocket arrangement comprises a plurality of conveyor support tabs for engaging one or more profiles along the length of the at least one continuous conveyor mechanism.

21. The subterranean energy storage system of claim 1, wherein the plurality of vessels are arranged along an entire length of the at least one continuous conveyor mechanism.

22. The subterranean energy storage system of claim 1, wherein the at least one transport shaft comprises a width to height aspect ratio of 1:100 to 1:10,000.

23. The subterranean energy storage system of claim 1, wherein any one of the first or second storage tanks comprises a width to height aspect ratio of 20:1 to 1:20.

24. The subterranean energy storage system of claim 1, wherein the at least one continuous conveyor mechanism comprises a chain.

25. The subterranean energy storage system of claim 1, wherein the at least one continuous conveyor mechanism comprises a belt.

26. The subterranean energy storage system of claim 1, wherein the at least one loading mechanism modulates the loading of the pseudo fluid into the vessels.

27. The subterranean energy storage system of claim 1, wherein the at least one unloading mechanism functions to release, empty or unload the pseudo fluid from the vessels.

28. The subterranean energy storage system of claim 1, wherein each vessel along the length of the at least one continuous conveyor mechanism comprises one or more rollers positioned on an underside of the vessel.

29. A subterranean energy storage system comprising:
a continuous conveyor mechanism, wherein the continuous conveyor mechanism comprises a plurality of vessels arranged along an entire length of the continuous conveyor mechanism, wherein the plurality of vessels are configured to transfer a high density material from a first storage tank to a second storage tank via a transport shaft to store potential energy, and the transfer of the high density material from the second storage tank to the first storage tank releases the stored potential energy, wherein the first and second storage tanks each comprise at least one loading mechanism to load the high density material into each of the vessels, whereby each successive vessel for loading is loaded above another vessel, and at least one unloading mechanism to unload the high density material from each of the vessels; and
an energy transfer means, wherein the energy transfer means comprises a first set of sprockets positioned above the second storage tank, and a second set of sprockets positioned proximal to the first storage tank, wherein the first and second sets of sprockets co-operate to transfer the high density material via the continuous conveyor mechanism to transfer power to and from the subterranean energy storage system.

* * * * *